US012095177B2

(12) United States Patent
Ross, III et al.

(10) Patent No.: US 12,095,177 B2
(45) **Date of Patent: *Sep. 17, 2024**

(54) ANTENNA ASSEMBLIES

(71) Applicant: Antennas Direct, Inc., Ellisville, MO (US)

(72) Inventors: John Edwin Ross, III, Moab, UT (US); Joanne Nosiglia, Eureka, MO (US)

(73) Assignee: Antennas Direct, Inc., Ellisville, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/235,658

(22) Filed: Aug. 18, 2023

(65) Prior Publication Data

US 2023/0411849 A1 Dec. 21, 2023

Related U.S. Application Data

(63) Continuation of application No. 17/667,185, filed on Feb. 8, 2022, now Pat. No. 11,769,947, which is a (Continued)

(51) Int. Cl.
*H01Q 5/378* (2015.01)
*H01Q 1/12* (2006.01)
(Continued)

(52) U.S. Cl.
CPC ........... *H01Q 5/378* (2015.01); *H01Q 1/1228* (2013.01); *H01Q 7/00* (2013.01); *H01Q 21/30* (2013.01)

(58) Field of Classification Search
CPC ........ H01Q 5/378; H01Q 1/1228; H01Q 7/00; H01Q 21/30; H01Q 5/40; H01Q 9/22;
(Continued)

(56) References Cited

U.S. PATENT DOCUMENTS 2,060,098 A 11/1936 Norman
2,220,008 A 10/1940 Woodward et al.
(Continued)

FOREIGN PATENT DOCUMENTS

CN 201243084 Y 5/2009
CN ZL2008200072832 5/2009
(Continued)

OTHER PUBLICATIONS

Mao S-G et al., "Time-domain characteristics of ultra-wideband tapered loop antennas", Electronics Letters, IEE Stevenage, GB, vol. 42, No. 22, Oct. 26, 2006; 1262-1264; 2 pages.
(Continued)

*Primary Examiner* — Renan Luque
(74) *Attorney, Agent, or Firm* — Harness, Dickey & Pierce, P.L.C.; Anthony G. Fussner

(57) ABSTRACT

Exemplary embodiments are disclosed of antenna assemblies configured for reception of television signals, such as high definition television (HDTV) signals. In an exemplary embodiment, an antenna assembly generally includes a VHF antenna element and a UHF antenna element. The VHF antenna element and the UHF antenna element may be parasitically coupled without a direct ohmic connection between the VHF antenna element and the UHF antenna element. The antenna assembly may be configured to be operable for receiving VHF and UHF high definition television signals without using a diplexer and a VHF balun.

46 Claims, 26 Drawing Sheets

Related U.S. Application Data continuation of application No. 17/202,624, filed on Mar. 16, 2021, now Pat. No. 11,276,932, which is a continuation of application No. 16/405,835, filed on May 7, 2019, now Pat. No. 10,957,979.

(60) Provisional application No. 62/782,273, filed on Dec. 19, 2018, provisional application No. 62/776,344, filed on Dec. 6, 2018.

(51) Int. Cl.
*H01Q 7/00* (2006.01)
*H01Q 21/30* (2006.01)

(58) Field of Classification Search
CPC .. H01Q 1/36; H01Q 1/42; H01Q 1/50; H01Q 9/16; H01Q 19/10; H01Q 21/0006
See application file for complete search history.

(56) References Cited

U.S. PATENT DOCUMENTS 2,437,251 A 3/1948 Frische et al.
2,480,155 A 8/1949 Masters
2,589,578 A 3/1952 Sabins
D170,203 S 8/1953 Leonard
D171,560 S 2/1954 Ritter
D177,200 S 3/1956 Valiulis
D179,111 S 11/1956 Ballan
2,821,710 A 1/1958 Hale
3,015,101 A 12/1961 Turner et al.
3,123,826 A 3/1964 Durham
3,161,975 A 12/1964 McMillan
3,239,838 A 3/1966 Kelleher
3,261,019 A 7/1966 Lundy
3,273,158 A 9/1966 Fouts et al.
D209,402 S 11/1967 Burlingame
D211,025 S 5/1968 Callaghan
3,434,145 A 3/1969 Wells
3,521,284 A 7/1970 Strom et al.
3,560,983 A 2/1971 Willie et al.
3,587,105 A 6/1971 Neilson
3,721,990 A 3/1973 Gibson et al.
3,739,388 A 6/1973 Callaghan
3,828,867 A 8/1974 Elwood
3,971,031 A 7/1976 Burke
4,183,027 A 1/1980 Ehrenspeck
4,184,163 A 1/1980 Woodward
4,418,427 A 11/1983 Muterspaugh
4,710,775 A 12/1987 Coe
D310,671 S 9/1990 Weiss
4,987,424 A 1/1991 Tamura et al.
D318,673 S 7/1991 Terk
D327,690 S 7/1992 Ogawa et al.
D332,262 S 1/1993 Borchardt
5,262,793 A 11/1993 Sperry
5,280,645 A 1/1994 Nguyen et al.
D344,731 S 3/1994 Witzky
5,313,218 A 5/1994 Busking
5,943,025 A 8/1999 Benham et al.
D414,495 S 9/1999 Heiligenstein et al.
5,959,586 A 9/1999 Benham et al.
D421,610 S 3/2000 Ghalebi
6,054,963 A 4/2000 Muterspaugh
6,239,764 B1 5/2001 Timofeev et al.
D449,593 S 10/2001 Schultz
6,590,541 B1 7/2003 Schultze
6,593,886 B2 7/2003 Schantz
D480,714 S 10/2003 Wang
6,680,708 B2 1/2004 Yamaki
D501,468 S 2/2005 Wang
6,885,352 B2 4/2005 Lee et al.
6,917,793 B2 7/2005 Wang
6,922,179 B2 7/2005 McCollum
7,091,925 B1 8/2006 Wang
7,126,556 B1 10/2006 Wang
7,209,089 B2 4/2007 Schantz
D544,471 S 6/2007 Wang
7,239,290 B2 7/2007 Poilasne et al.
7,245,266 B1 7/2007 Szente et al.
D558,189 S 12/2007 Inoue
7,356,362 B2 4/2008 Chang et al.
7,436,973 B2 10/2008 Liao
D581,931 S 12/2008 Pine
D585,883 S 2/2009 Kaneko
D598,433 S 8/2009 Schneider et al.
D598,434 S 8/2009 Schneider et al.
D598,469 S 8/2009 Harris, Jr.
7,609,222 B2 10/2009 Schneider et al.
D604,276 S 11/2009 Schneider et al.
D611,460 S 3/2010 Chao
7,693,570 B2 4/2010 Green et al.
D624,531 S 9/2010 Fleck et al.
7,839,347 B2 11/2010 Schneider et al.
7,839,351 B2 11/2010 Schadler et al.
7,898,496 B2 3/2011 Olsen et al.
D638,031 S 5/2011 Lee et al.
7,936,311 B2 5/2011 Rowser et al.
7,990,335 B2 8/2011 Schneider et al.
D655,692 S 3/2012 Silverman et al.
8,144,069 B2 3/2012 Sadowski et al.
8,174,457 B1 5/2012 Lam
D664,564 S 7/2012 Gillett et al.
D666,178 S 8/2012 Schneider et al.
8,368,607 B2 2/2013 Schneider et al.
8,736,500 B1 5/2014 Lam
8,994,600 B2 3/2015 Schneider et al.
9,698,750 B2 7/2017 Qureshi
9,761,935 B2 9/2017 Ross, III et al.
10,128,575 B2 11/2018 Ross, III et al.
10,957,979 B2 * 3/2021 Ross, III ................ H01Q 5/378
11,276,932 B2 * 3/2022 Ross, III .................. H01Q 9/22
11,769,947 B2 * 9/2023 Ross, III .................. H01Q 5/40 343/741
2002/0158798 A1 10/2002 Chiang et al.
2003/0071757 A1 4/2003 Yamaki
2004/0090379 A1 5/2004 Fourdeux et al.
2004/0090385 A1 5/2004 Green
2004/0113841 A1 6/2004 Louzir et al.
2004/0217912 A1 11/2004 Mohammadian
2005/0088342 A1 4/2005 Parsche
2005/0162332 A1 7/2005 Schantz
2005/0259023 A1 11/2005 Wang
2005/0280582 A1 12/2005 Powell et al.
2006/0033665 A1 2/2006 Yang
2006/0055618 A1 3/2006 Poilasne et al.
2006/0077115 A1 4/2006 Oh et al.
2006/0103577 A1 5/2006 Lee
2006/0164304 A1 7/2006 Huang et al.
2007/0069955 A1 3/2007 McCorkle
2007/0200769 A1 8/2007 Nakano et al.
2007/0229379 A1 10/2007 Eckwielen
2008/0040464 A1 2/2008 Chia
2008/0094291 A1 4/2008 Bystrom et al.
2008/0211720 A1 9/2008 Hansen
2008/0258980 A1 10/2008 Chen et al.
2008/0291345 A1 11/2008 Schneider
2009/0058732 A1 3/2009 Nakano et al.
2009/0073067 A1 3/2009 Soler Castany et al.
2009/0146899 A1 6/2009 Schneider et al.
2010/0045551 A1 2/2010 Schneider et al.
2010/0085269 A1 4/2010 Sadowski et al.
2010/0117925 A1 * 5/2010 Conrad .................. H01Q 21/12 343/878
2013/0113672 A1 * 5/2013 Schneider ................ H01Q 9/28 343/795
2014/0292597 A1 10/2014 Schneider et al.
2015/0236423 A1 * 8/2015 Yang ........................ H01Q 7/00 343/700 MS
2017/0062919 A1 3/2017 Ross, III et al.

(56) References Cited

U.S. PATENT DOCUMENTS

| | | | |
|---|---|---|---|
| 2019/0081401 | A1 | 3/2019 | Ross, III et al. |
| 2022/0166143 | A1 | 5/2022 | Ross, III et al. |

FOREIGN PATENT DOCUMENTS

| | | | |
|---|---|---|---|
| CN | ZL2008301199963 | | 5/2009 |
| CN | 101453057 | A | 6/2009 |
| CN | ZL2008301199978 | | 7/2009 |
| CN | ZL2008300091398 | | 9/2009 |
| CN | 203260723 | U | 10/2013 |
| CN | 203707328 | U | 7/2014 |
| EM | 000946587 | | 5/2008 |
| EP | 1555717 | A1 | 7/2005 |
| EP | 1653560 | A1 | 5/2006 |
| EP | 1753080 | A1 | 2/2007 |
| GB | 2263360 | A | 7/1993 |
| GB | 2410837 | A | 8/2005 |
| JP | D1213590 | | 6/2004 |
| TW | M249233 | U | 11/2004 |
| TW | D112283 | | 8/2006 |
| TW | D119092 | | 9/2007 |
| TW | 200926506 | A | 6/2009 |
| TW | D129744 | | 7/2009 |
| TW | D129745 | | 7/2009 |
| TW | D129746 | | 7/2009 |
| TW | 201712939 | A | 4/2017 |
| WO | WO-2009073249 | A1 | 6/2009 |

OTHER PUBLICATIONS

European Search Report dated Apr. 24, 2014 for EP application No. 14153878.5 which claims priority to the instant application; 9 pages.
IEEE Spectrum: Antennas for the New Airwaves, http://www.spectrum.IEEE.org/print/7328, Published Feb. 2009, 9 pages, Authors Richard Schneider and John Ross.
Antenna Engineering Handbook, 3rd Edition, Edited by Richard C. Johnson, McGraw Hill, 1993, pp. 5-13 to 5-16.
One-Element Loop Antenna with Finite Reflector, B. Rojarayanont and T. Sekiguchi, Electronics & Communications in Japan, vol. 59-B, No. 5, May 1976, 10 pgs.
Frequency-and Time-Domain Modeling of Tapered Loop Antennas in Ultra-Wideband Radio Systems, Shiou-Li Chen and Shau-Gang Mao, Graduate Institute of Computer and Communication Engineer, pp. 179-182, IEEE copyright notice 2006.
Planar Miniature Tapered-Slot-Fed Annular Slot Antennas for Ultrawide-Band Radios, Tzyh-Ghuang Ma, Student Member, and Shyh-Kang, Jeng, Senior Member, IEEE, IEEE Transactions on Antennas and Propagation, vol. 53, No. 3, Mar. 2005, pp. 1194-1202.
Self-Mutual Admittances of Two Identical Circular Loop Antennas in a Conducting Medium and in Air, K. Iizuka, Senior Member, IEEE, R. W. P. King, Fellow, IEEE, and C. W. Harrison, Jr., Senior Member, IEEE, IEEE Transactions on Antennas andPropagation, vol. AP014, No. 4, Jul. 1966, pp. 440-450.
A Broadband Eccentric Annular Slot Antenna, Young Hoon Suh and Ikmo Park, Department of Electrical Engineering, Ajou University, pp. 94-97, IEEE copyright notice 2001.
A Printed Crescent Patch Antenna for Ultrawideband Applications, Ntsanderh C. Azenui an H.Y.D. Yang, IEEE Antennas and Wireless Propragation Letters, vol. 6, 2007, pp. 113-116.
Design of Compact Components for Ultra Wideband Communication Front Ends, Marek Bialkowski, Amin Abbosh, and Hing Kan, School of Information Technology and Electrical Engineering, the University of Queensland, four pages.
Nonfinal Office Action dated Apr. 17, 2012 from design U.S. Appl. No. 29/376,791 which is a continuation of the instant application; 8 pages.
Tofel, Kevin C., HD Picture frame antenna, Aug. 11, 2005, http://hd.engadget.com/2005/08/11/hd-picture-frame-antenna, 1 page.
Antennas Direct, PF7 Picture Frame Antenna, Oct. 1, 2005, Antennas Direct, http://web.archive.org/web/20051001102653/http://antennasdirect.com/PF7.su-b.--antenna.html, 1 page.
United States Office Action dated Sep. 13, 2011, issued in U.S. Appl. No. 12/126,593, which shares a common inventor with the instant application, 13 pages.
European Search Report dated Jan. 17, 2011, issued by the European Patent Office for European Patent Application No. EP 10193159.0 which is related to the instant application through a priority claim; (5 pages).
European Supplementary Search Report and Opinion dated Oct. 7, 2010, issued by the European Patent Office for European Patent Application No. EP 08747115 (6 pages).
Clearstream.Tm. 2V; http://www.antennasdirect.com/cmss.sub.--files/attachmentlibrary/pdf/C2-V-.sub.--QS.sub.--FINAL.sub.--20120702.pdf; Jul. 2, 2012; 2 pgs.
Chinese office action dated Nov. 4, 2015 for Chinese application No. 2014101113505 filed Feb. 7, 2014, published as CN103972657 on Aug. 6, 2014, which names the same inventors, Richard E. Schneider and John Edwin Ross III, as the instant application but is not related through a priority claim; 7 pages.
C. M. Shah, S. Siriam, M. Bhaskaran and A. Mitchell, "Large area metal-silicone flexible electronic structures," 2010 Conference on Optoelectronic and Microelectronic Materials and Devices, Canberra, ACT, 2010, pp. 187-188.
Antenna Theory: a. Review, Balanis, Proc. IEEE vol. 80 No. Jan. 1, 1992, 17 pages.
"Television Antenna", Wikipedia: The Free encyclopedia. Wikimedia Foundation, Inc. Mar. 13, 2017. Web. Mar. 15, 217, 6 pages.
"Analog High-Definition Television System", Wikipedia: the Free Encyclopedia. Wikimedia Foundation, Inc. Oct. 12, 2016. Web. Mar. 16, 2017, 5 pages.
Nonfinal Office Action dated May 18, 2018 for U.S. Appl. No. 15/685,749, filed Aug. 24, 2017 which is the parent application to the isntant application; 8 pages.
Taiwan Office Action and its English trasnlation for Taiwan application No. 108140789 which claims priority to the instant application, dated Sep. 25, 2020 8 pages.
Chinese Office Action (and its English translation) for Chinese appliction No. 201911217049.1 which claims priority to the instant application; dated Nov. 4, 2020, 12 pages.
European Search Report dated Apr. 24, 2014 for EP application No. 14153878.5 which names the same inventors as the instant application but is not related through a priority claim; 9 pages.
One-Element Loop Antenna with Finite Reflector, B. Rojarayanont and T. Sekiguchi, Electronics & Communications in Japan, vol. 59-B, No. 5, May 1976, 10 pages.
Nonfinal Office Action dated Apr. 17, 2012 from design U.S. Appl. No. 29/376,791 which names one the same inventors as the instant application but is not related through a priority claim; 8 pages.
United States Office Action dated Sep. 13, 2011, issued in U.S. Appl. No. 12/126,593, which which names one the same inventors as the instant application but is not related through a priority claim, 13 pages.
European Supplementary Search Report and Opinion dated Oct. 7, 2010, issued by the European Patent Office for European Patent Application No. EP 08747115 which names one the same inventors as the instant application but is not related through apriority claim (2 pages).
Chinese office action dated Nov. 4, 2015 for Chinese application No. 2014101113505 filed Feb. 7, 2014, published as CN103972657 on Aug. 6, 2014, which names one the same inventors as the instant application, but is not related through a priorityclaim; 7 pages.
Non-final Office Action dated May 18, 2018 for U.S. Appl. No. 15/685,749, filed Aug. 24, 2017 which names one the same inventors as the instant application but is not related through a priority claim; 8 pages.
Chinese Office Action (and its English translation) for Chinese application No. 201911217049.1 which claims priority to the instant application; dated Nov. 4, 2020, 12 pages.

(56) References Cited

OTHER PUBLICATIONS

Taiwan Office Action and its English translation for Taiwan application No. 108140789 which claims priority to the instant application, dated Sep. 25, 2020 8 pages.

* cited by examiner

ANTENNA ASSEMBLIES

CROSS-REFERENCE TO RELATED APPLICATIONS

This application is a continuation of allowed U.S. patent application Ser. No. 17/667,185 filed Feb. 8, 2022, which published as US2022/0166143 on May 26, 2022.

U.S. patent application Ser. No. 17/667,185 is a continuation of U.S. patent application Ser. No. 17/202,624 filed Mar. 16, 2021, which published as US2021/0203073 on Jul. 1, 2021 and granted as U.S. Pat. No. 11,276,932 on Mar. 15, 2022.

U.S. patent application Ser. No. 17/202,624 is a continuation of U.S. patent application Ser. No. 16/405,835 filed May 7, 2019, which published as US2020/0185832 on Jun. 11, 2020 and issued as U.S. Pat. No. 10,957,979 on Mar. 23, 2021.

U.S. patent application Ser. No. 16/405,835 claimed the benefit of and priority to U.S. Provisional Application No. 62/776,344 filed Dec. 6, 2018 and U.S. Provisional Application No. 62/782,273 filed Dec. 19, 2018.

The entire disclosures of the above applications are incorporated herein by reference.

FIELD

The present disclosure generally relates to antenna assemblies configured for reception of television signals, such as high definition television (HDTV) signals.

BACKGROUND

The statements in this section merely provide background information related to the present disclosure and may not constitute prior art.

Many people enjoy watching television. Recently, the television-watching experience has been greatly improved due to high definition television (HDTV). A great number of people pay for HDTV through their existing cable or satellite TV service provider. In fact, many people are unaware that HDTV signals are commonly broadcast over the free public airwaves. This means that HDTV signals may be received for free with the appropriate antenna.

DRAWINGS

The drawings described herein are for illustration purposes only and are not intended to limit the scope of the present disclosure in any way.

Figure 1:
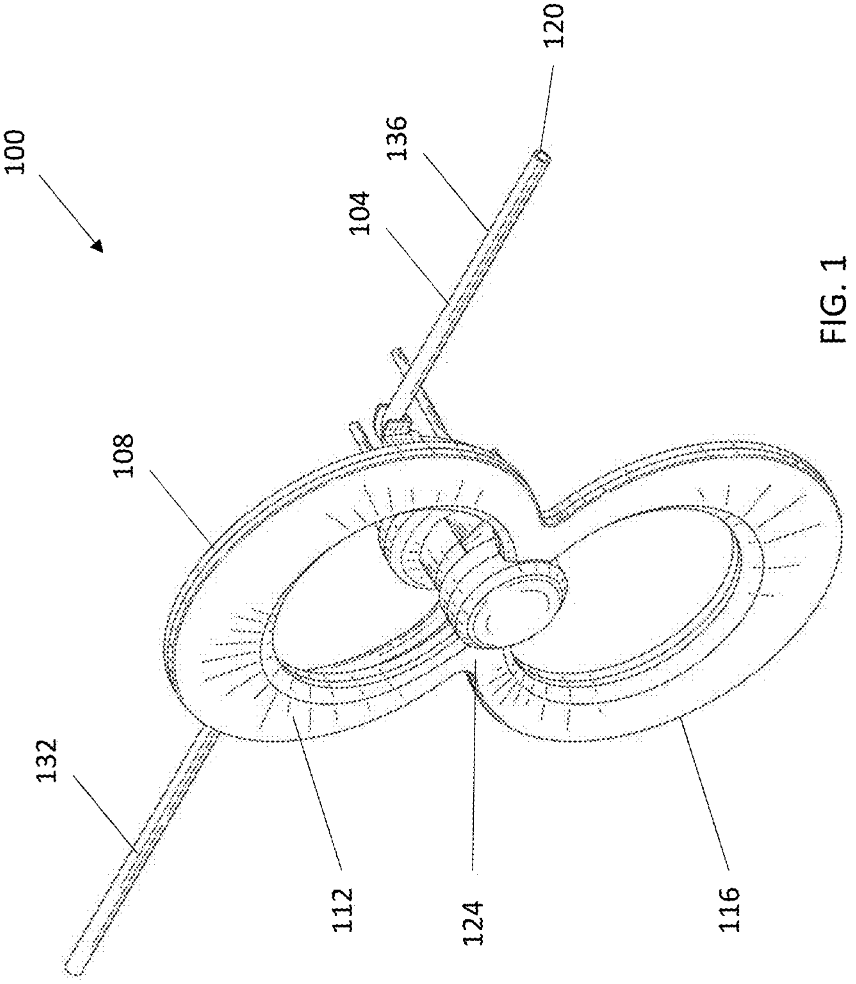
FIG. 1 is a perspective view of an exemplary embodiment of an antenna assembly, which may be used, for example, for receiving broadcast signals, such as digital television signals, high definition television (HDTV) signals, etc.
Figure 11:
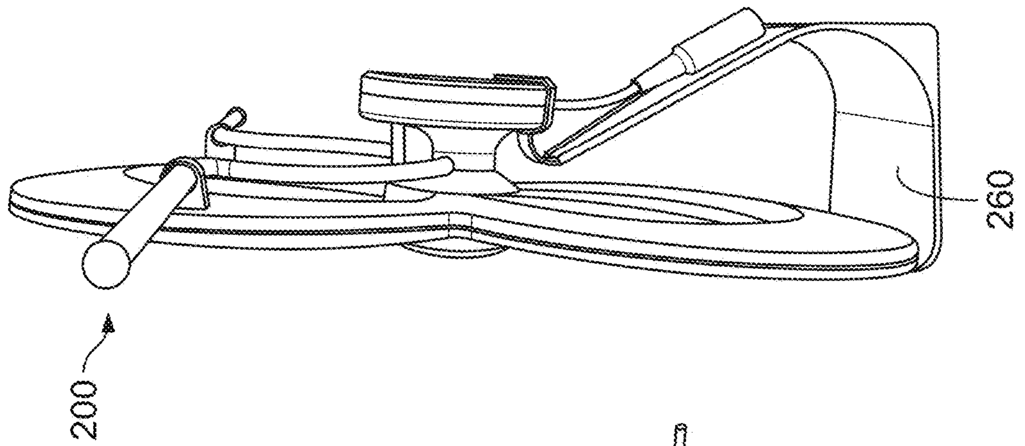
Figure 10:
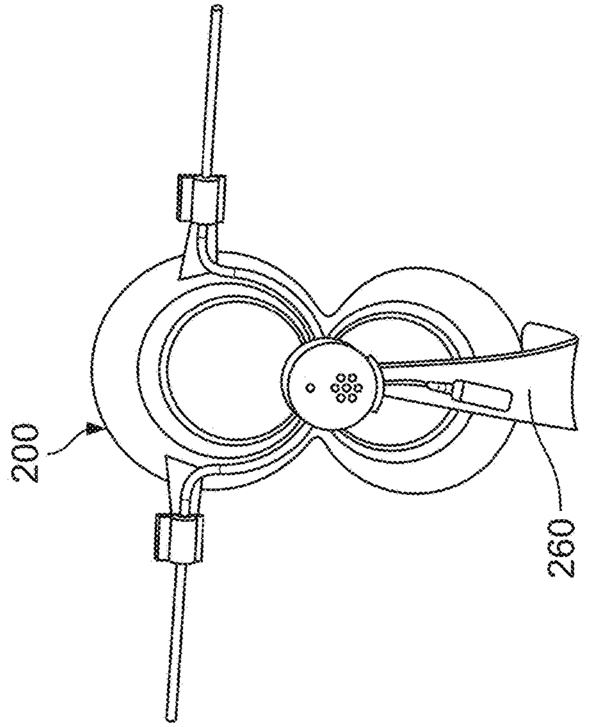
Figure 9:
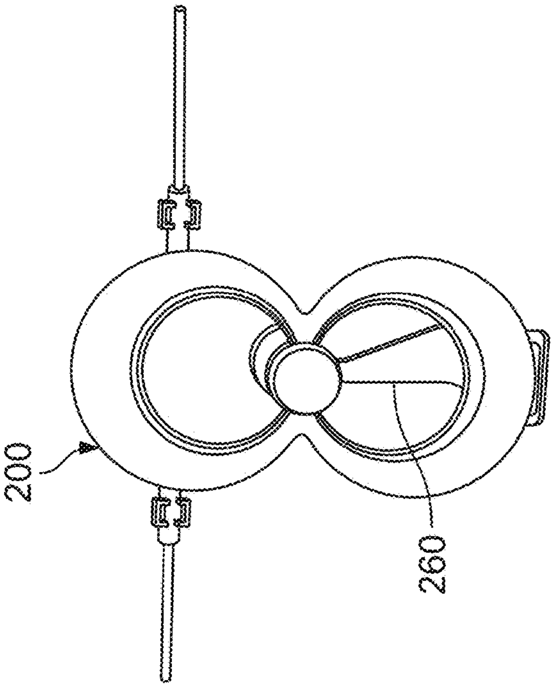

FIGS. 9, 10, and 11 are front, back, and side views, respectively, of a prototype of the antenna assembly shown in FIG. 1 being supported by a dielectric stand on a support surface for use indoors according to an exemplary embodiment.

Figure 12:
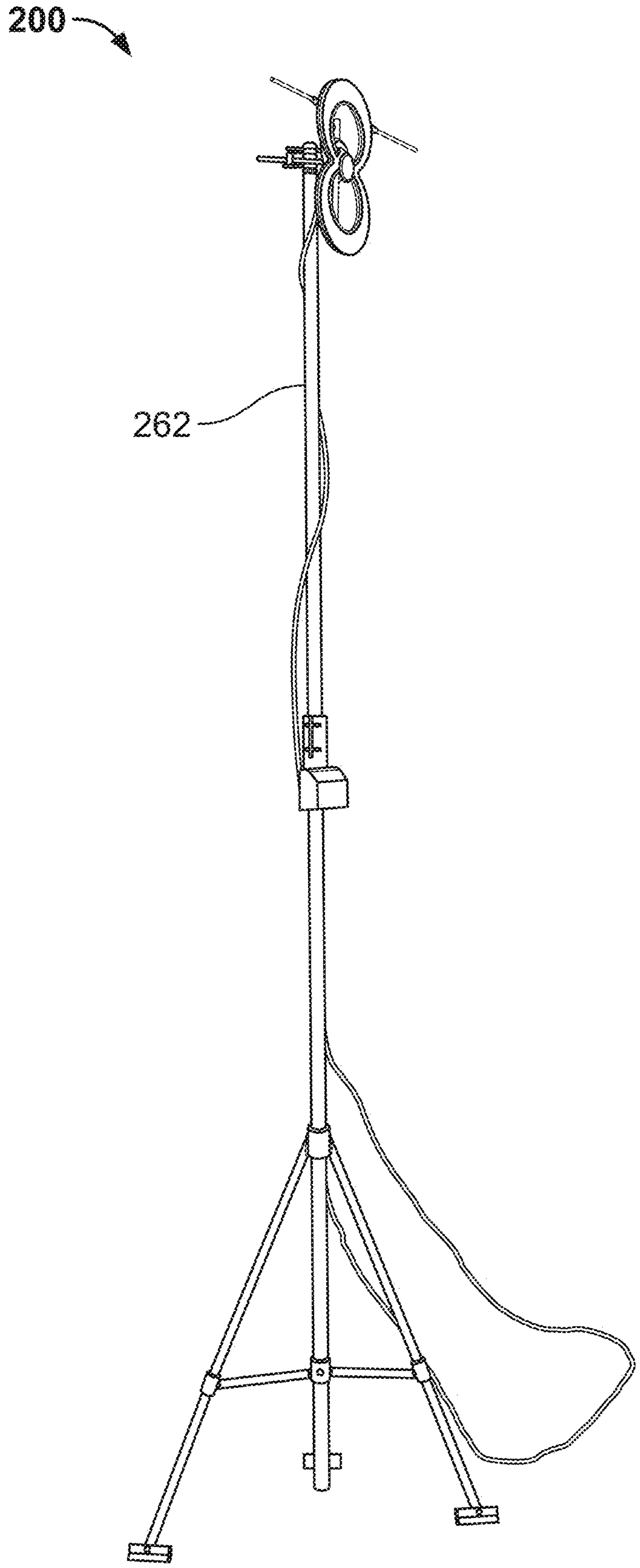

FIG. 12 shows the prototype of the antenna assembly shown in FIG. 9 being supported on a pole for use outdoors according to an exemplary embodiment.

Figure 13:
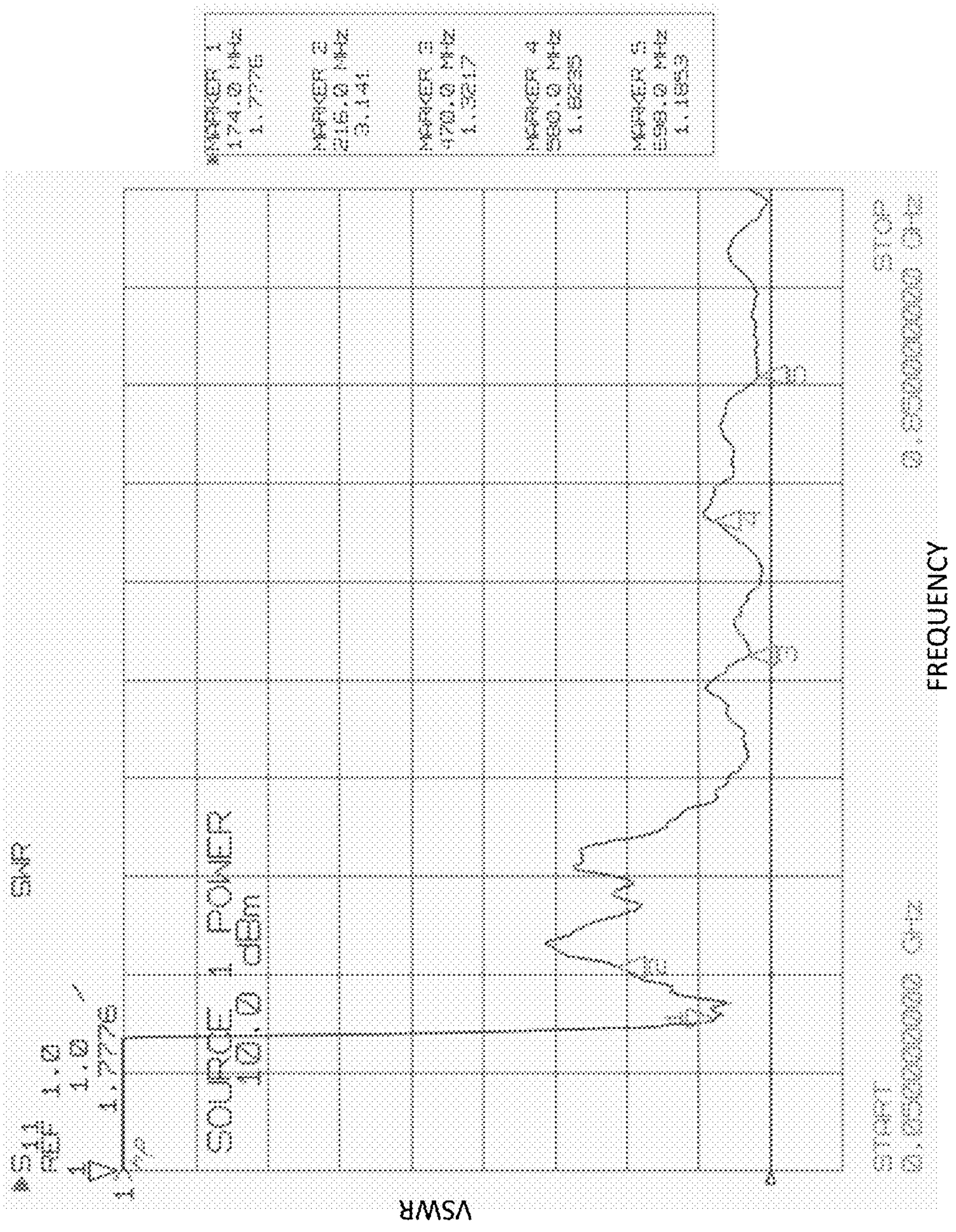

FIG. 13 is an exemplary line graph of voltage standing wave ratio (VSWR) versus frequency (MHz) measured for the prototype antenna assembly shown in FIGS. 9-11 while indoors and supported on a table by the dielectric stand shown in FIGS. 9-11.

Figure 14:
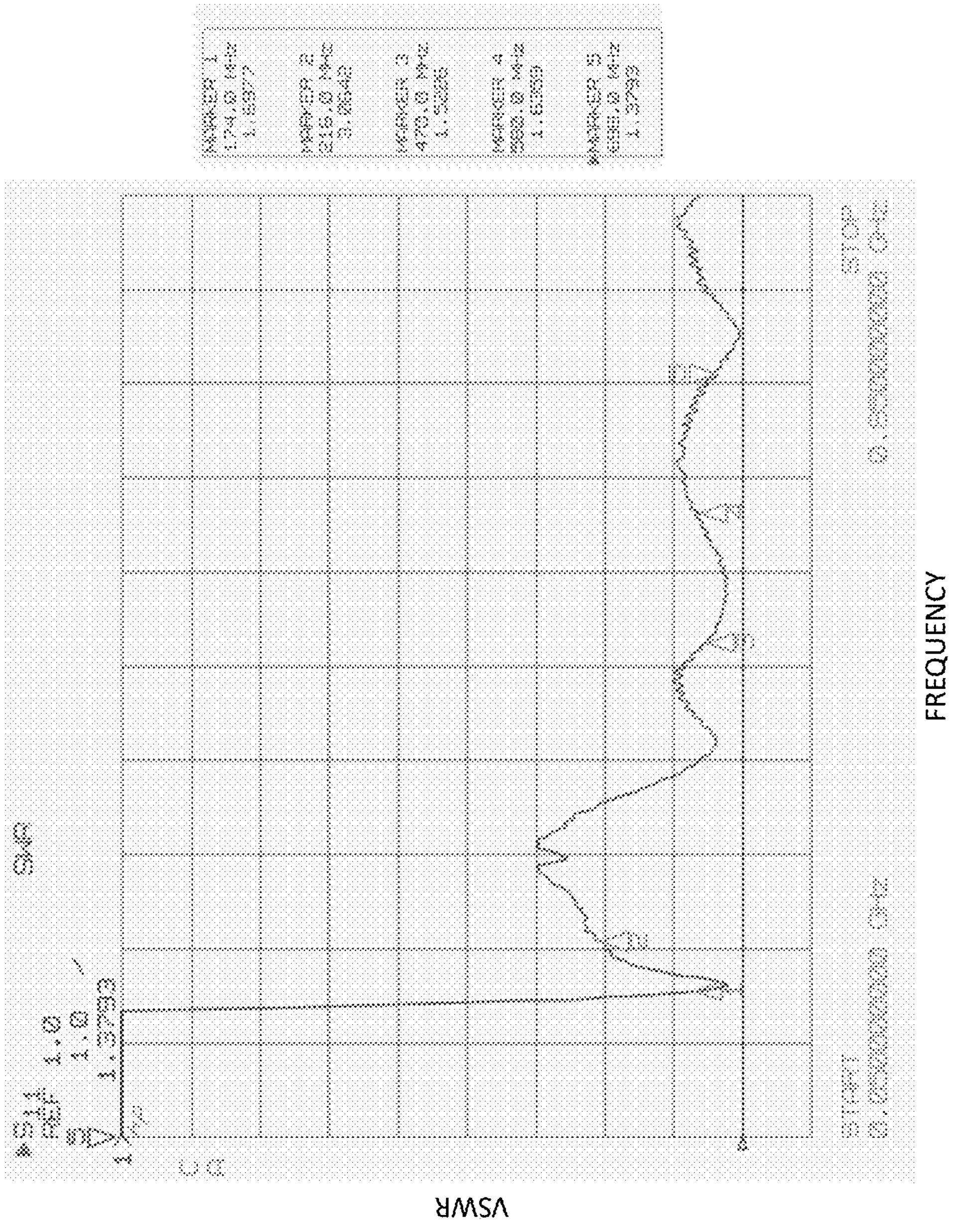

FIG. 14 is an exemplary line graph of VSWR versus frequency (MHz) measured for the prototype antenna assembly shown in FIG. 12 while outdoors on the pole shown in FIG. 12.

Figure 15:
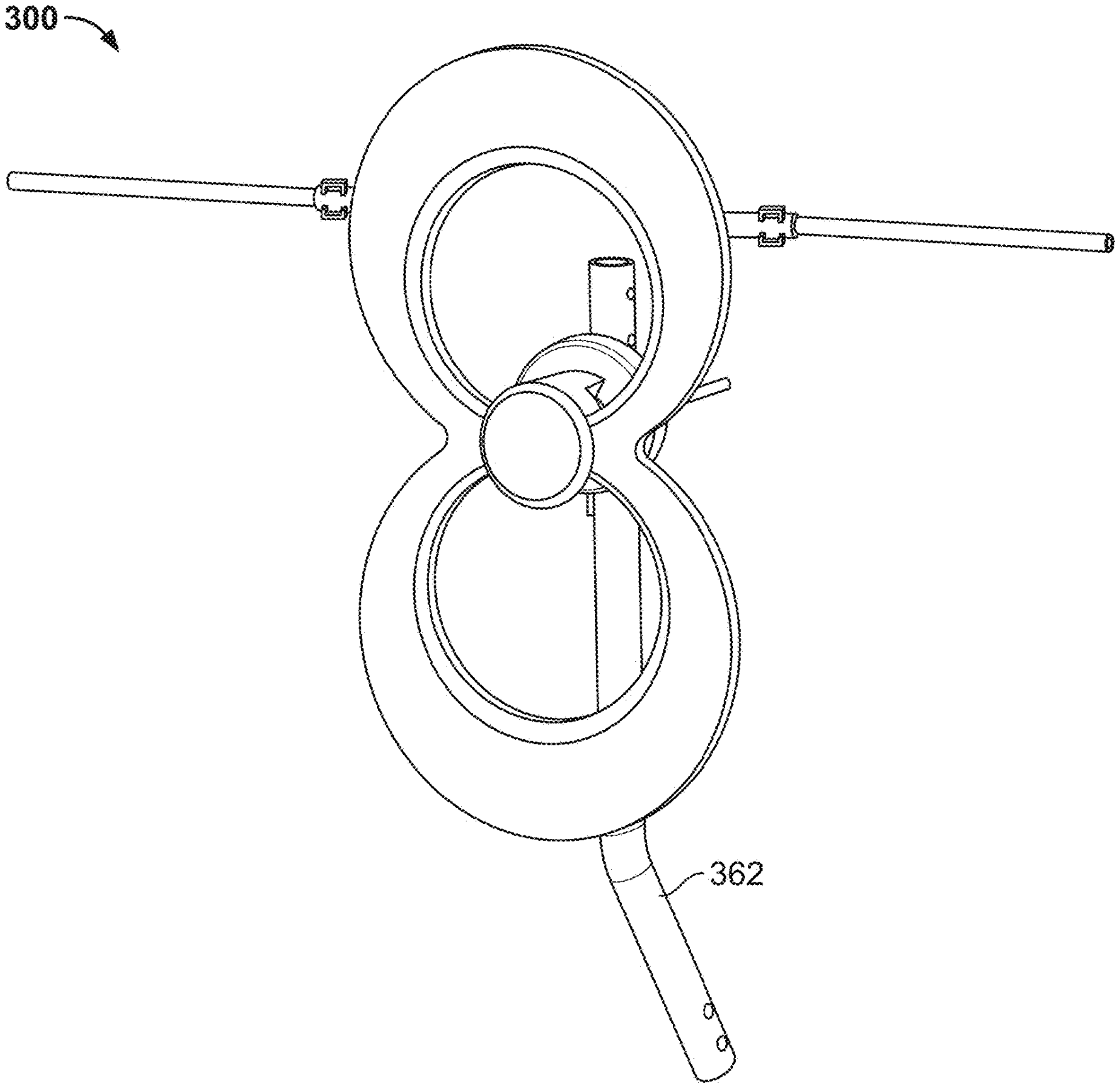
Figure 16:
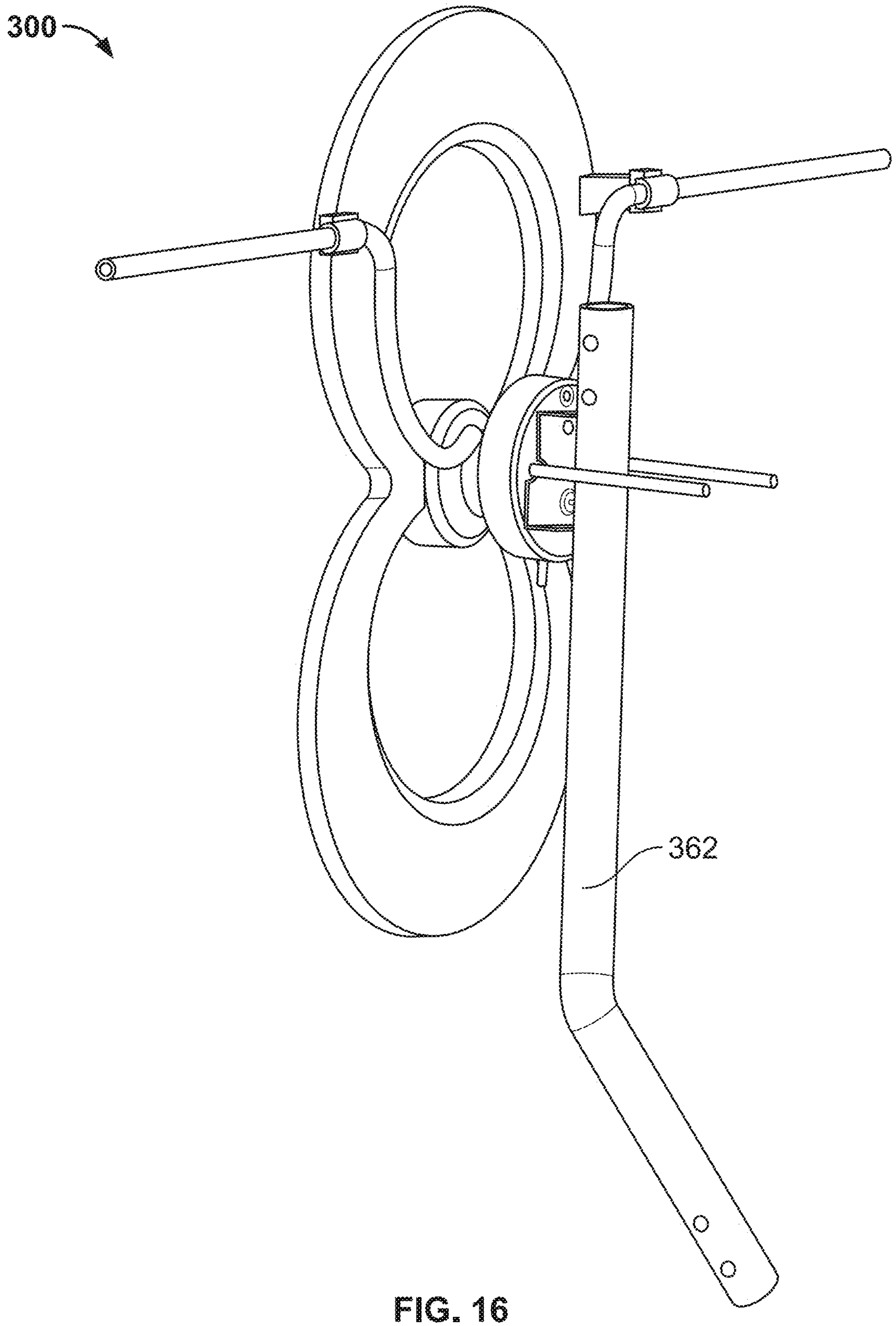
Figure 17:
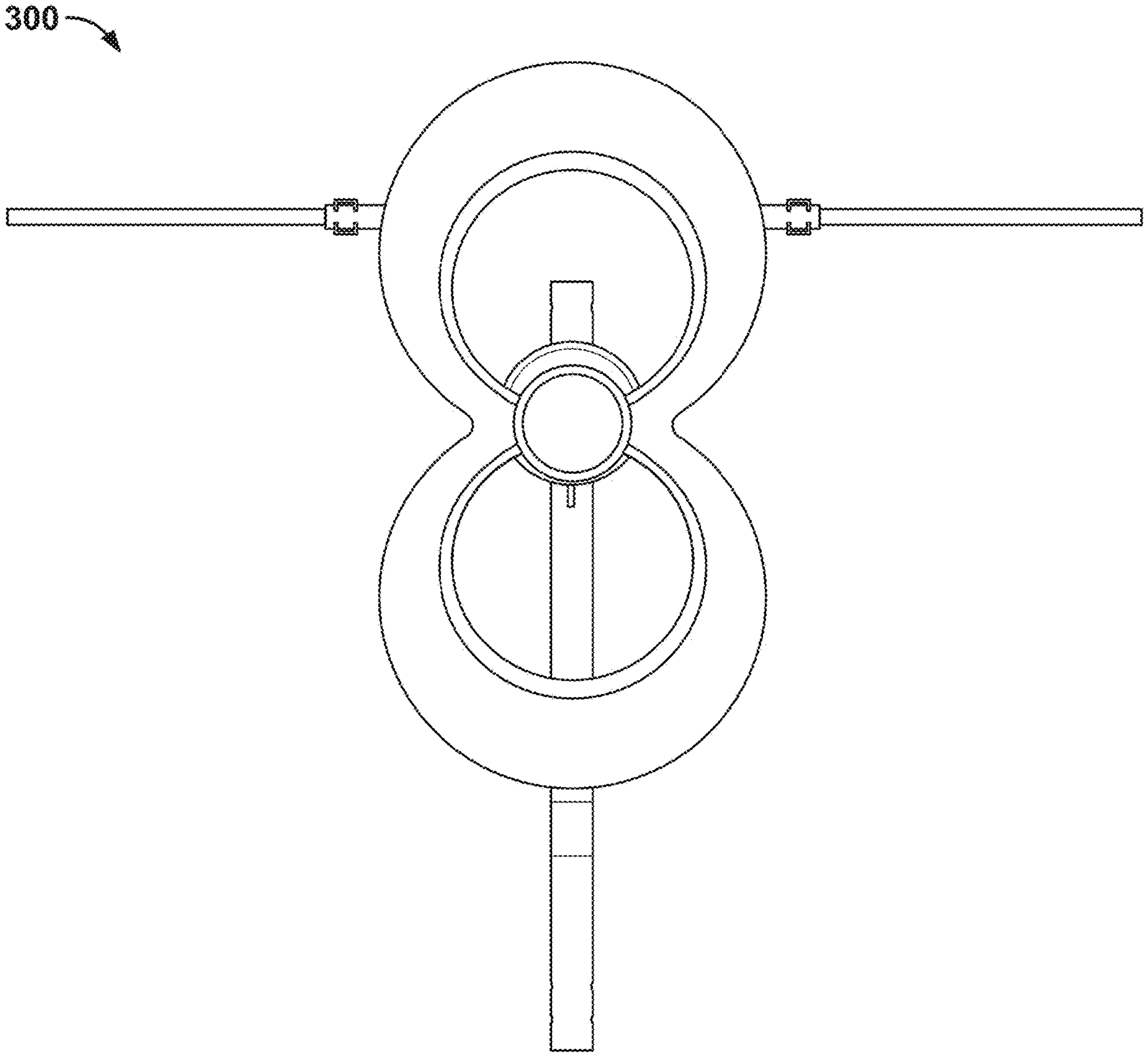
Figure 18:
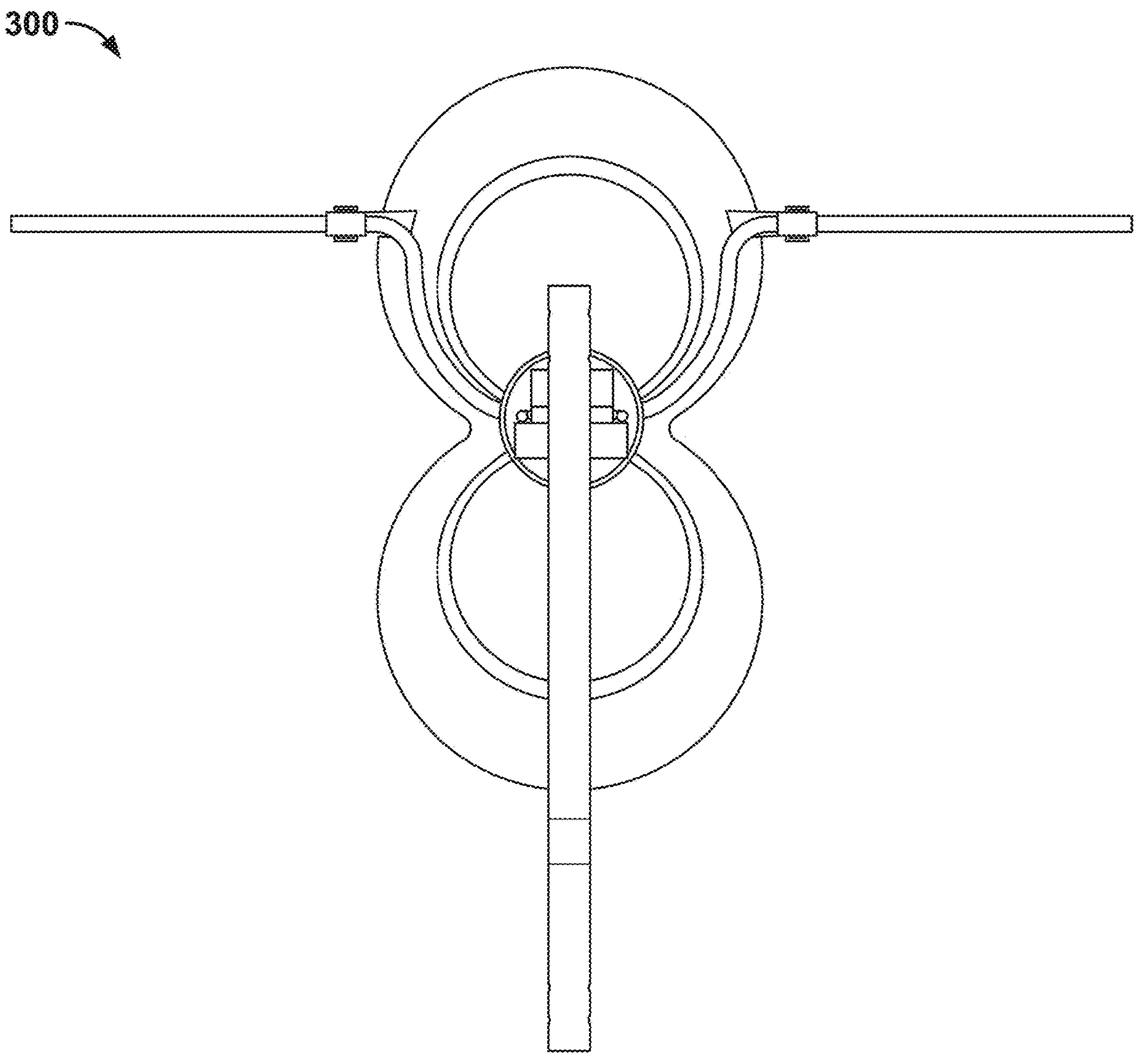
Figure 19:
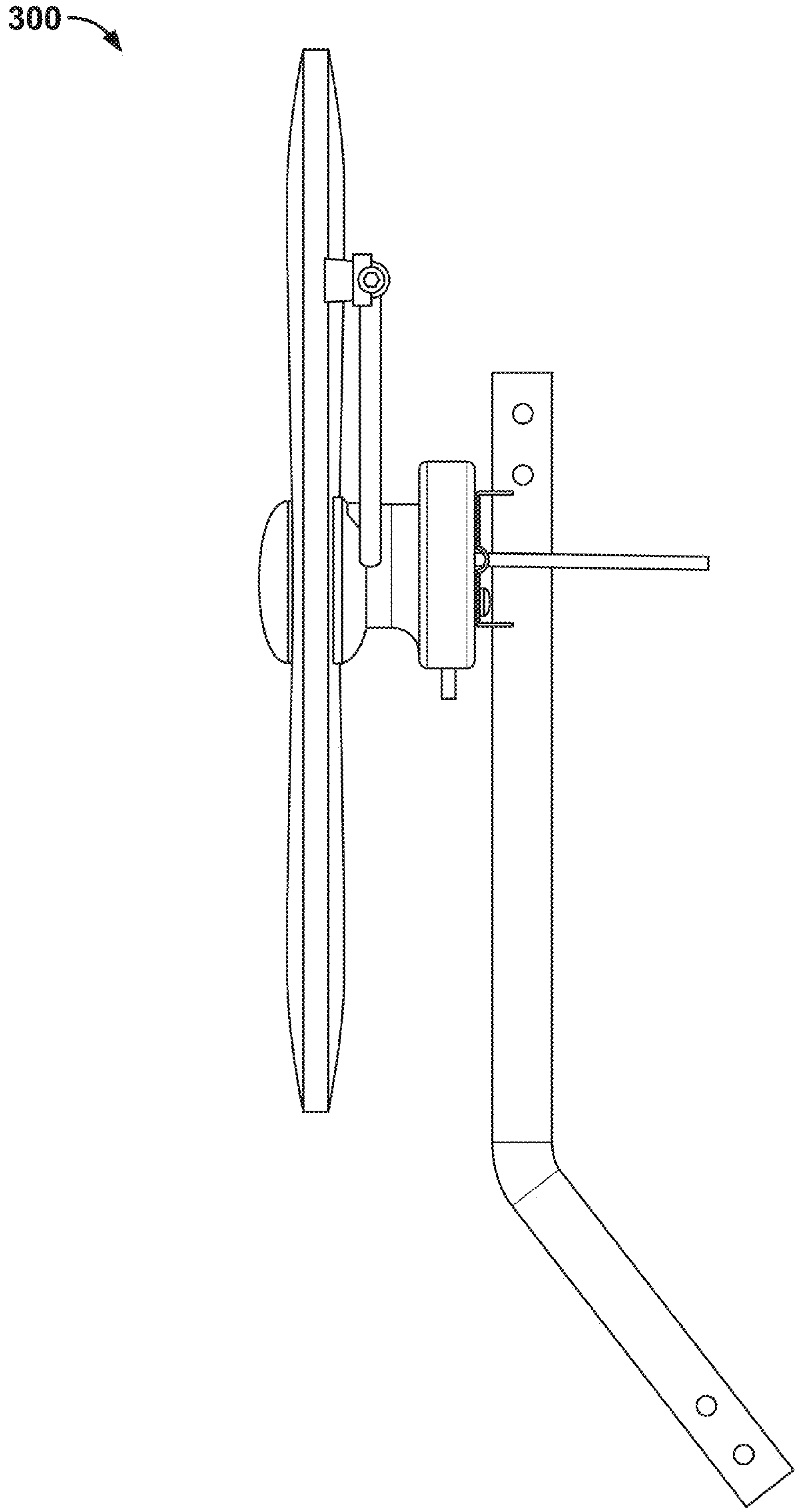
Figure 20:
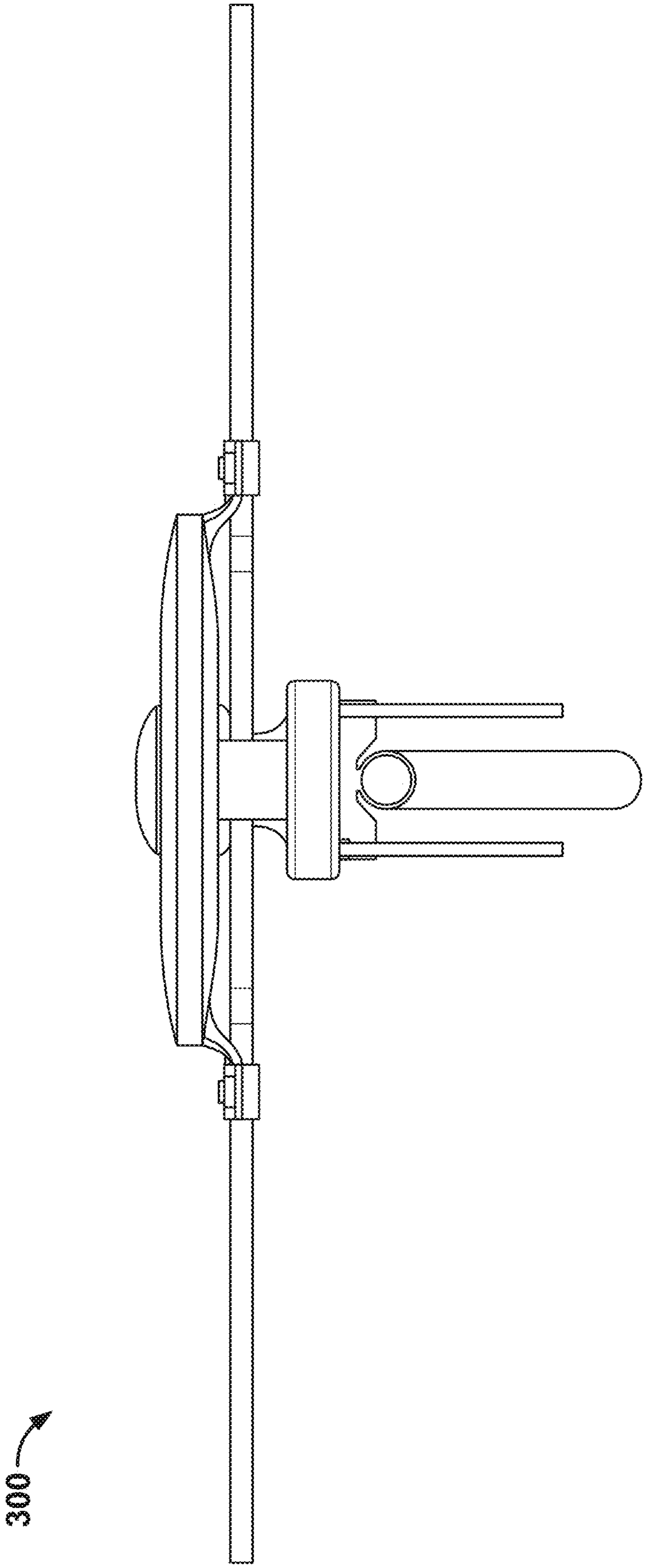

FIGS. 15 and 16 are front and back perspective views, respectively, of a computer simulation model of the antenna assembly shown in FIG. 1 being supported on a pole for use outdoors according to an exemplary embodiment.

FIGS. 17, 18, 19, and 20 are front, back, side, and top views, respectively, of the antenna assembly shown in FIGS. 15 and 16.

Figure 21:
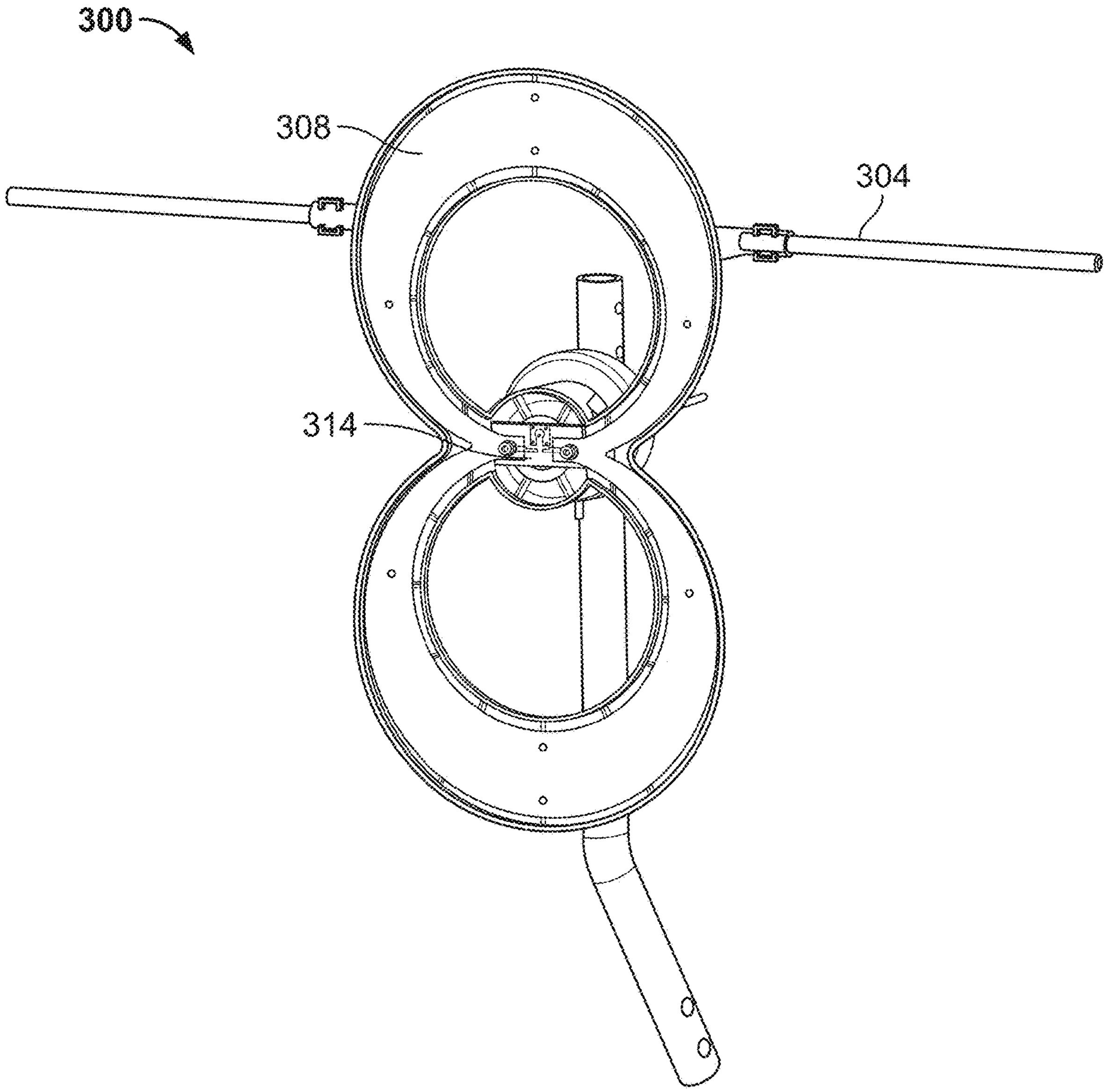

FIG. 21 is a front perspective view of the antenna assembly shown in FIGS. 15 and 16 with a front portion of the antenna housing removed.

Figure 22:
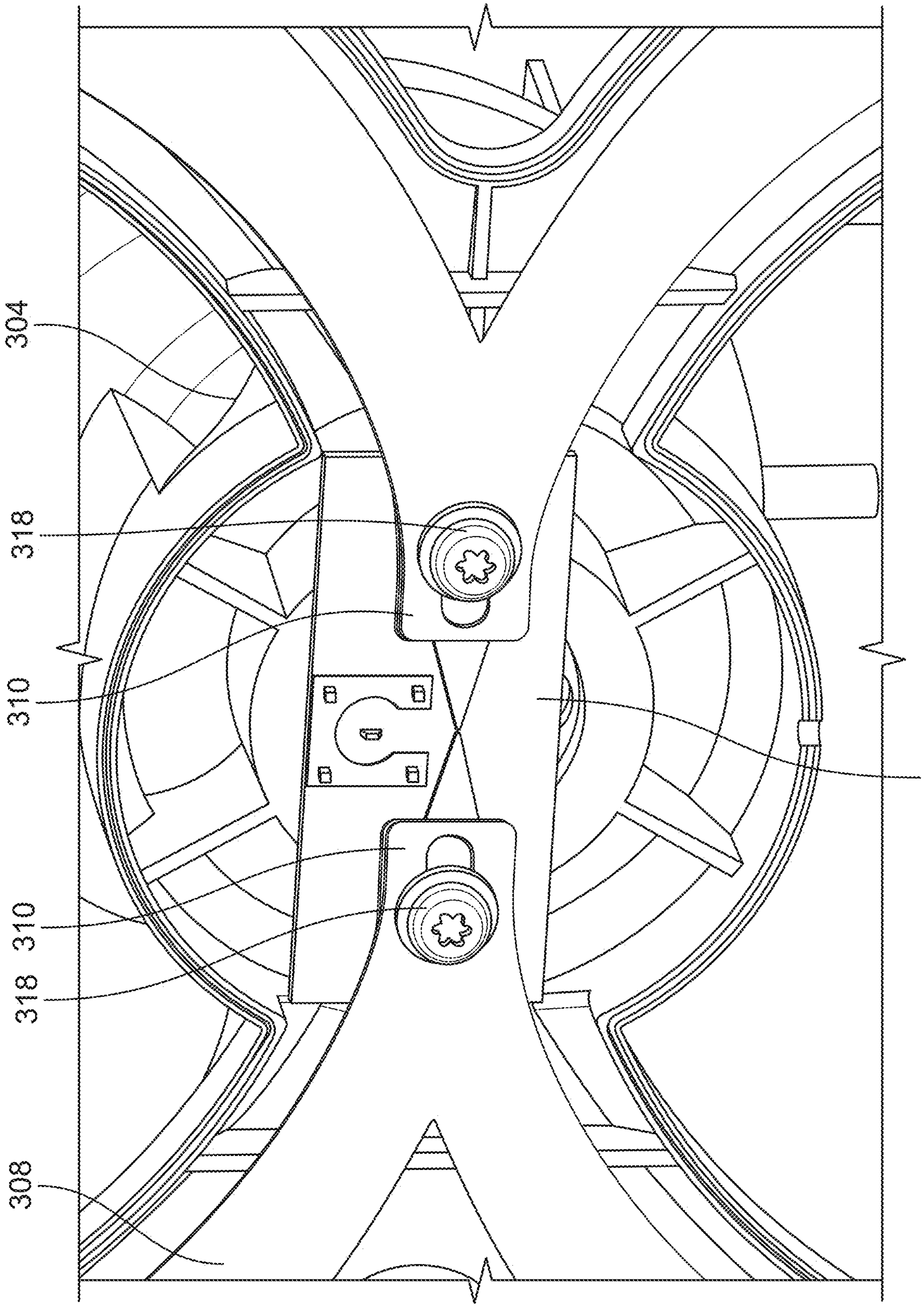

FIG. 22 is a front perspective of a portion of the antenna assembly shown in FIG. 21, and illustrating an exemplary feed with a 75:300 ohm balun.

Figure 23:
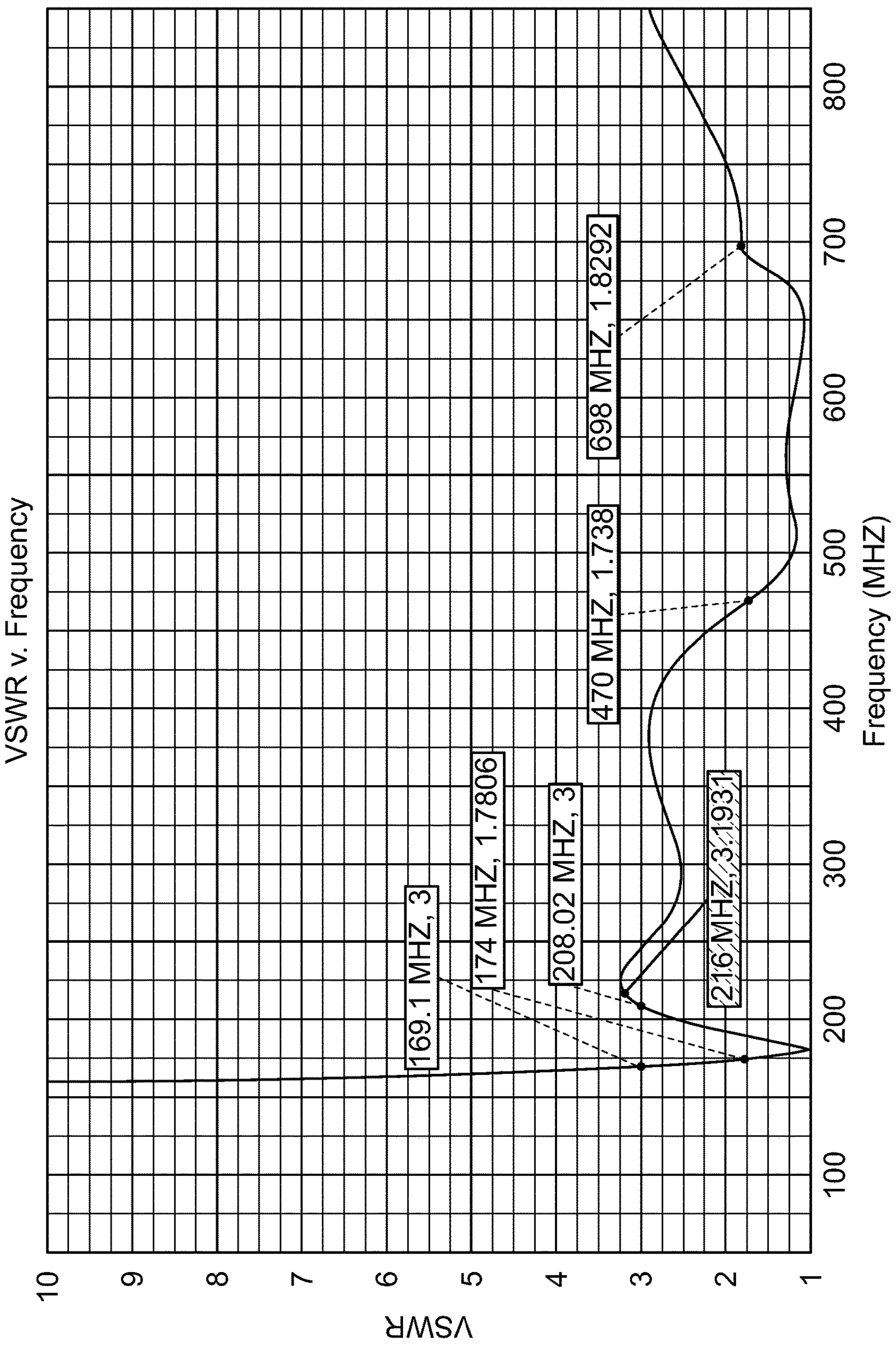

FIG. 23 is a line graph of VSWR versus frequency (MHz) for the computer simulation model of the antenna assembly shown in FIGS. 15-22, which was computed using a Remcom X-FDTD simulator.

Figure 24:
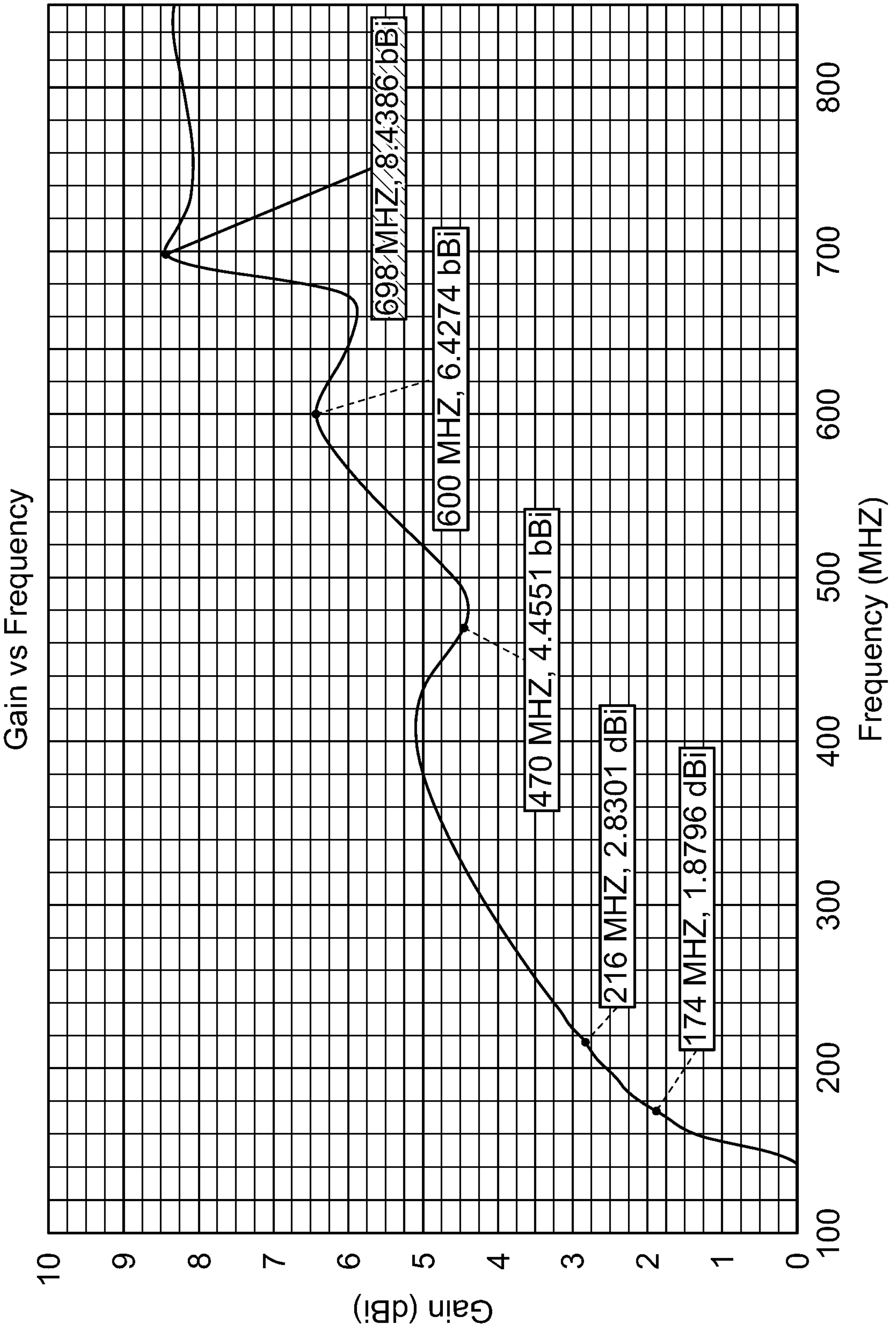

FIG. 24 is a line graph of gain (dBi) versus frequency (MHz) boresight for the computer simulation model of the antenna assembly shown in FIGS. 15-22, which was computed using a Remcom X-FDTD simulator.

Figure 25:
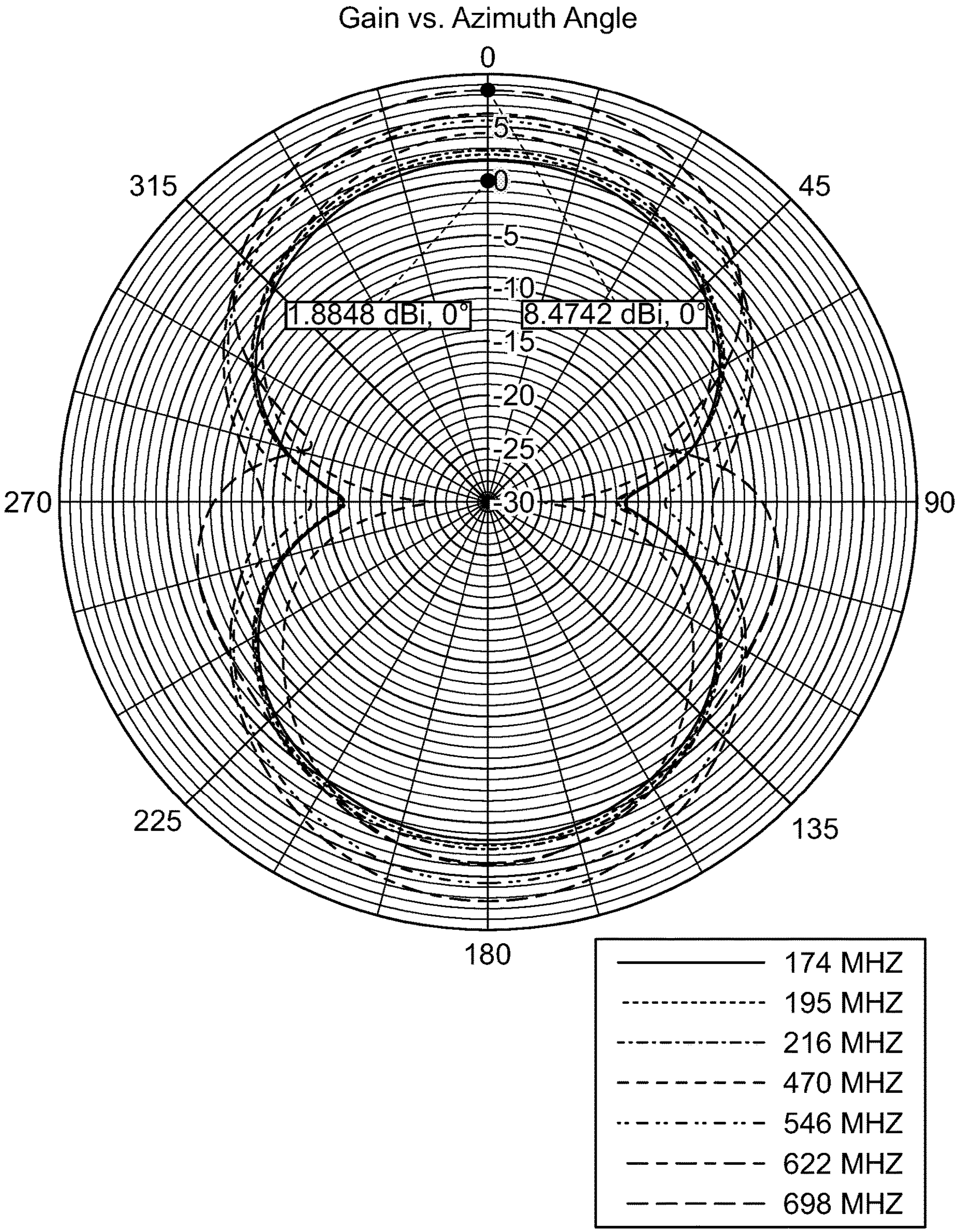

FIG. 25 is a plot of gain (dBi) versus azimuth angle for the computer simulation model of the antenna assembly shown in FIGS. 15-22 at frequencies of 174 MHz, 195 MHz, 216 MHz, 470 MHz, 546 MHz, 622 MHz, and 698 MHz, which was computed using a Remcom X-FDTD simulator.

Figure 26:
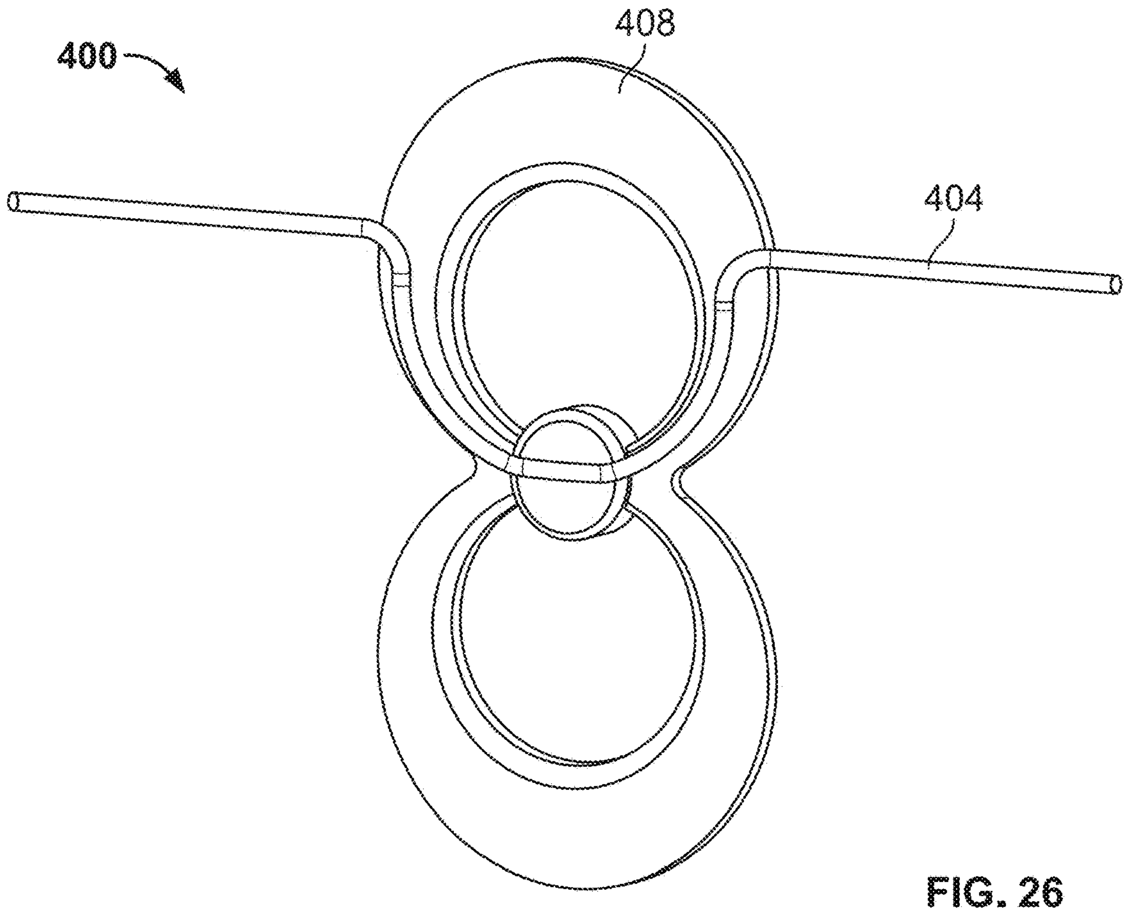

FIG. 26 is a perspective view of an antenna assembly including a VHF antenna element in front of a double tapered loop UHF antenna element according to an alternative exemplary embodiment.

Figure 27:
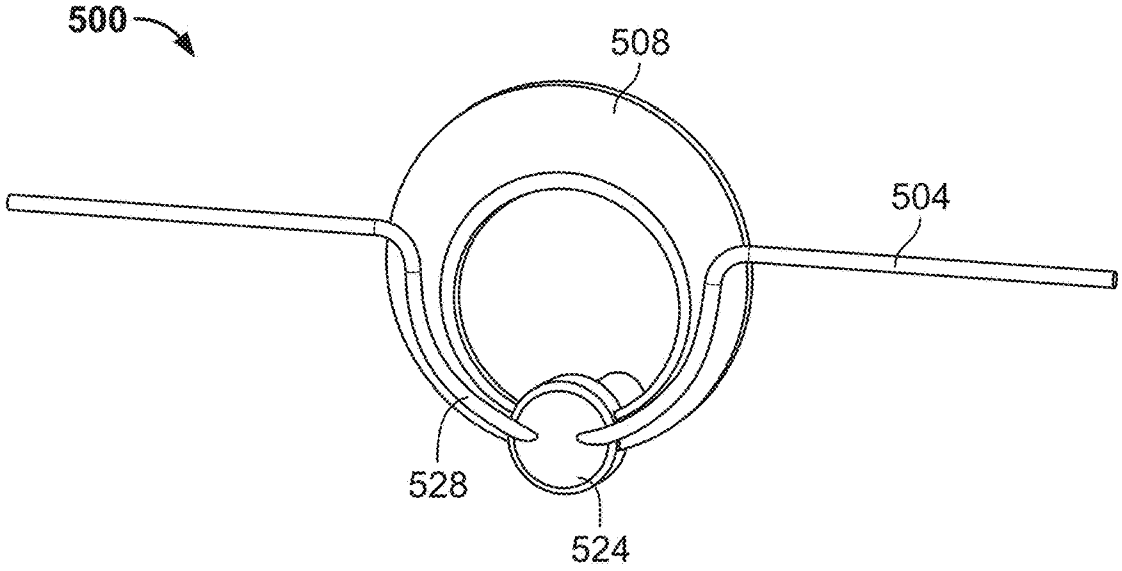

FIG. 27 is a perspective view of an antenna assembly including a VHF antenna element in front of a single tapered loop UHF antenna element according to another alternative exemplary embodiment.

Figure 28:
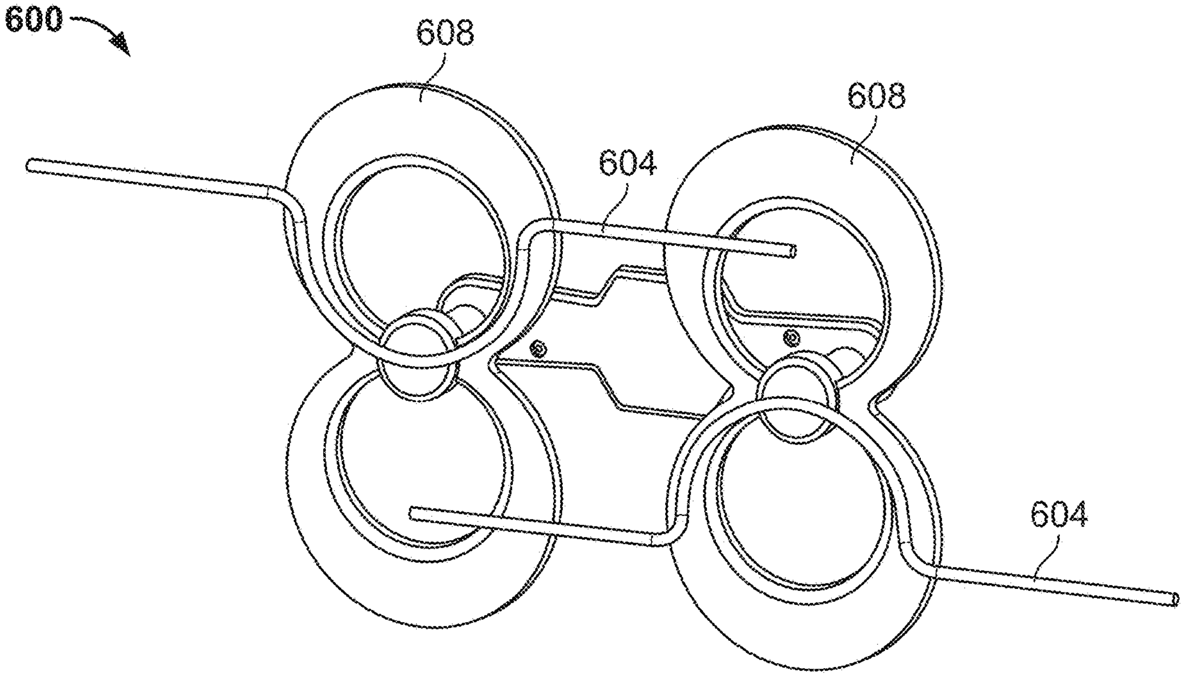

FIG. 28 is a perspective view of an antenna assembly including two VHF antenna elements in front of an array of two double tapered loop UHF antenna elements according to another alternative exemplary embodiment.

Figure 29:
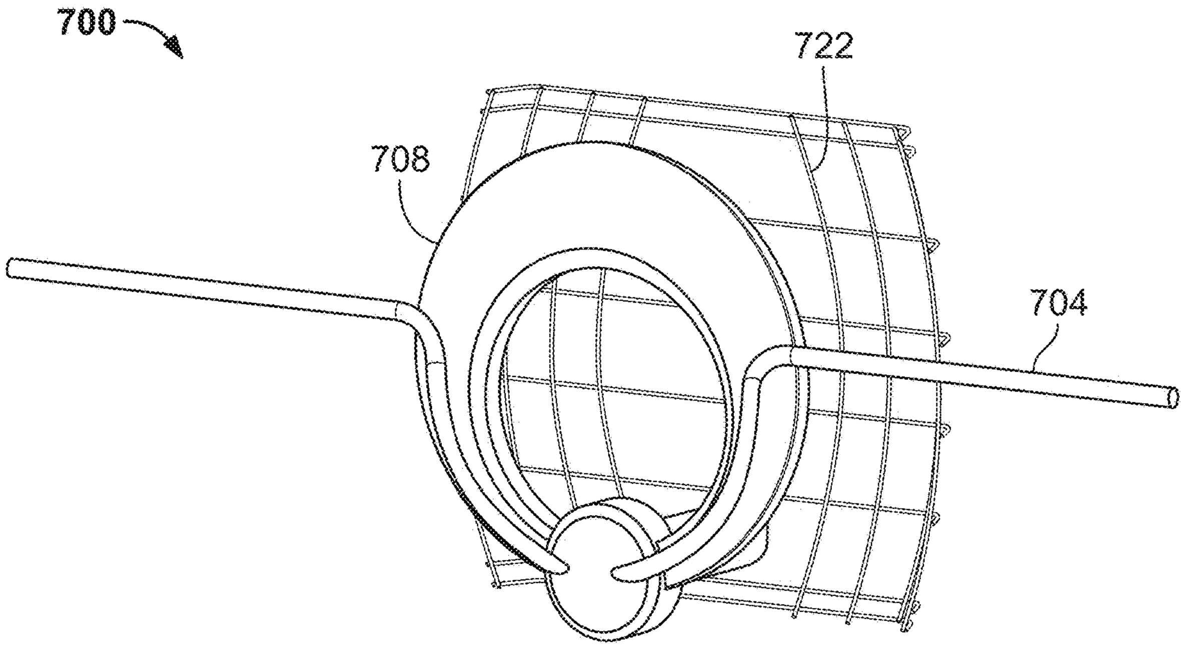

FIG. 29 is a perspective view of an antenna assembly including a VHF antenna element in front of a single tapered loop UHF antenna element and reflector according to another alternative exemplary embodiment.

Figure 30:
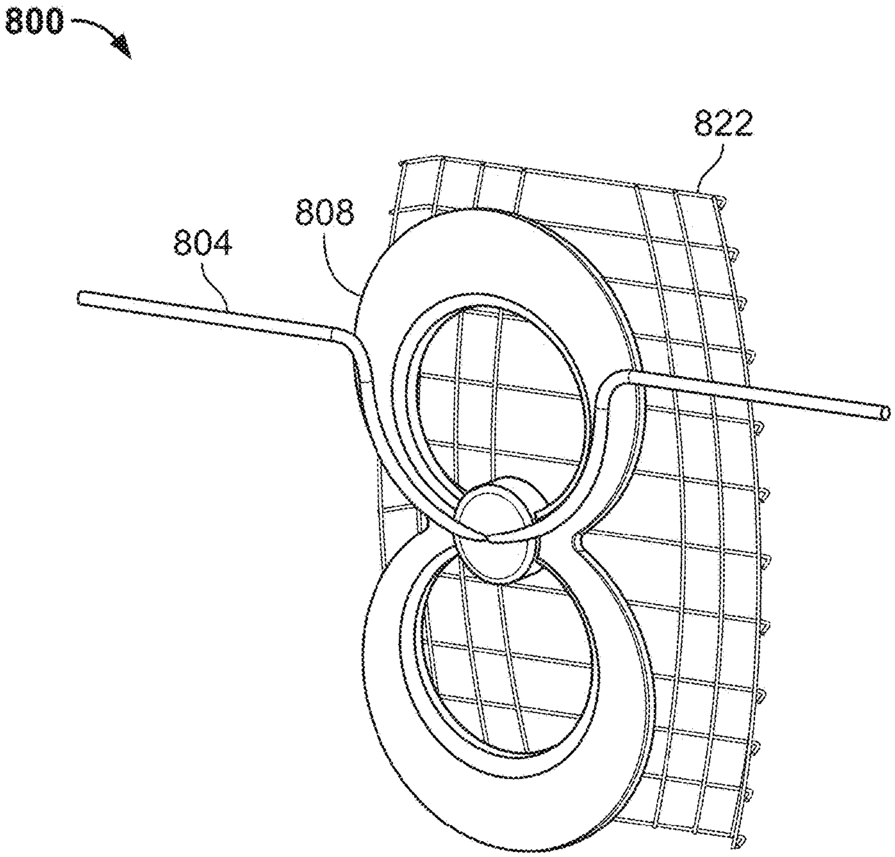

FIG. 30 is a perspective view of an antenna assembly including a VHF antenna element in front of a double tapered loop UHF antenna element and reflector according to another alternative exemplary embodiment.

Figure 31:
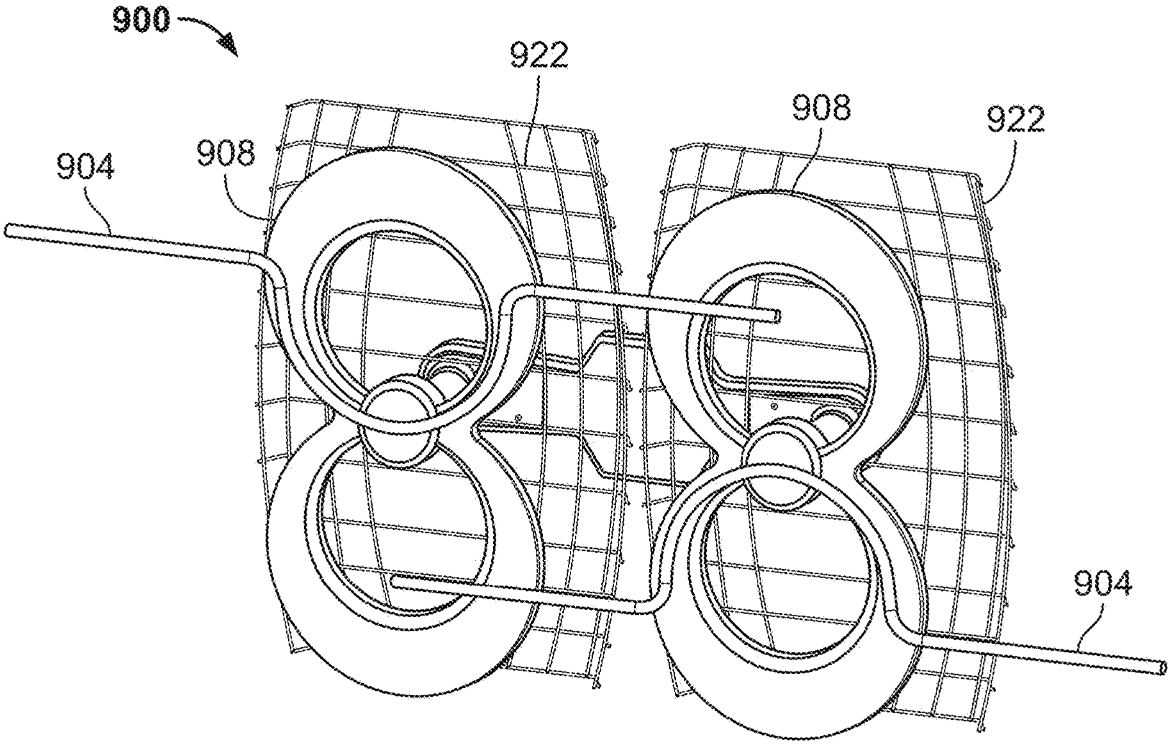

FIG. 31 is a perspective view of an antenna assembly including two VHF antenna elements in front of an array of two double tapered loop UHF antenna elements and two reflectors according to another alternative exemplary embodiment.

Figure 32:
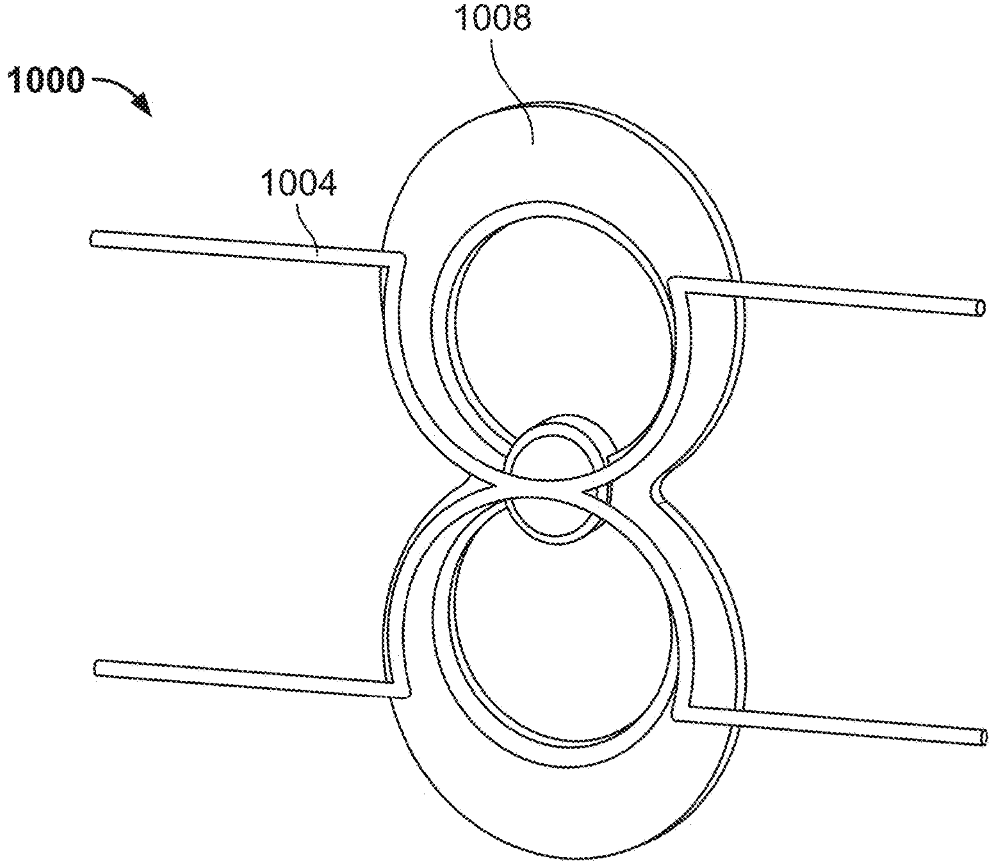

FIG. 32 is a perspective view of an antenna assembly including a double VHF antenna element in front of a double tapered loop UHF antenna element according to another alternative exemplary embodiment.

Figure 33:
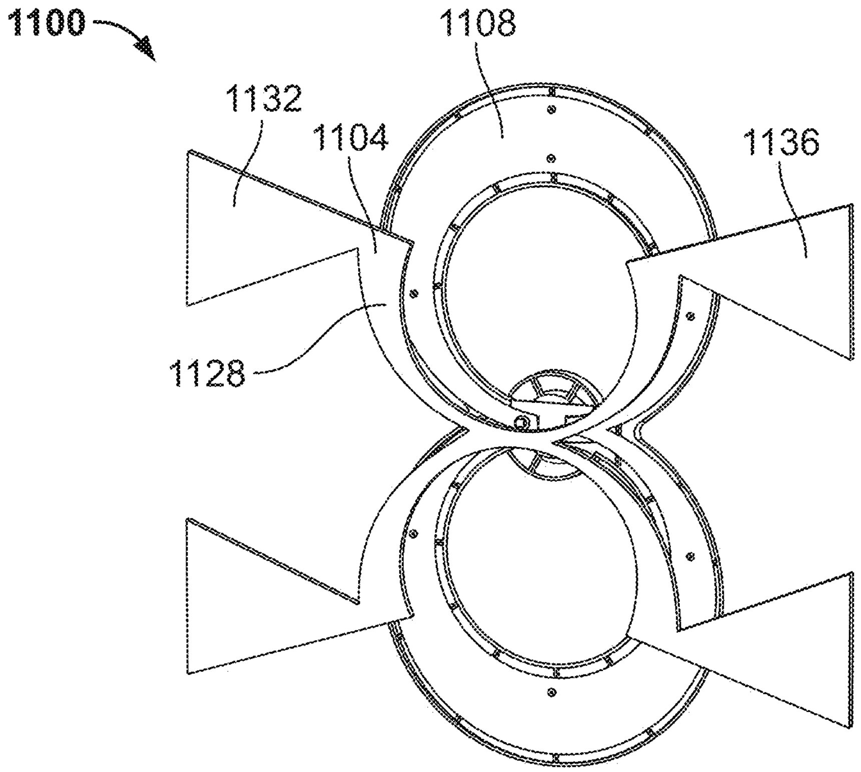

FIG. 33 is a perspective view of an antenna assembly including a double planar VHF antenna element with fan extensions in front of a double tapered loop UHF antenna element according to another alternative exemplary embodiment.

Figure 34:
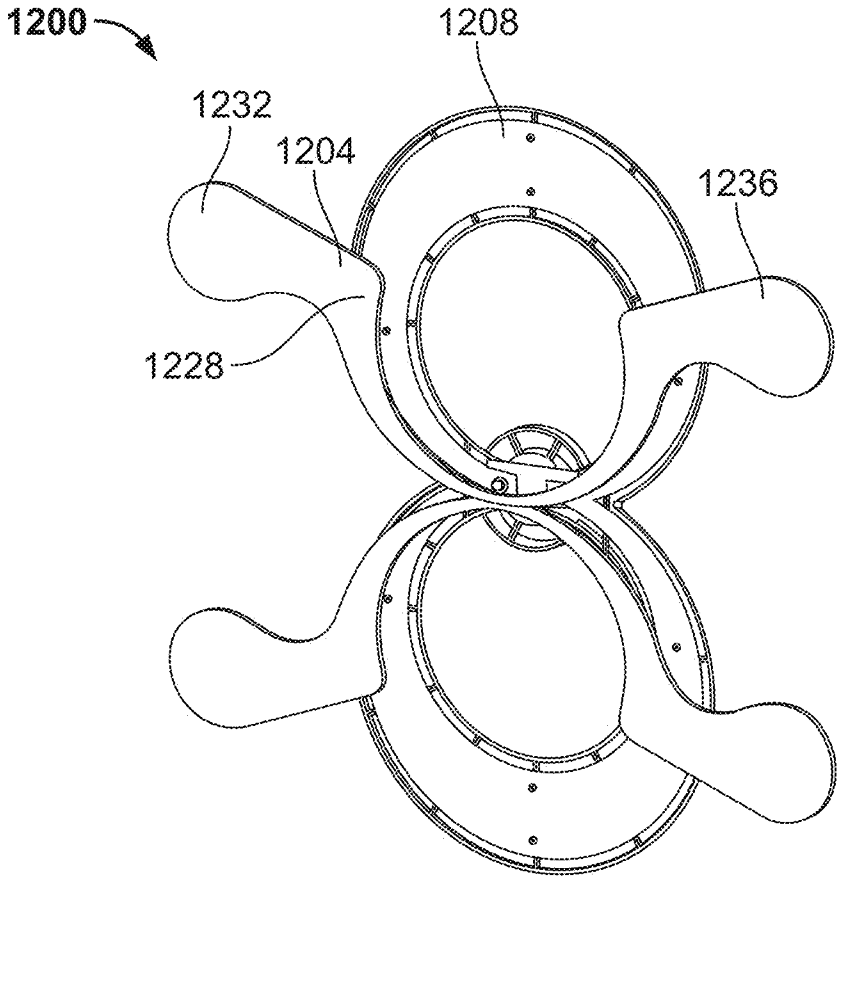

FIG. 34 is a perspective view of an antenna assembly including a double planar VHF antenna element with rounded fan extensions in front of a double tapered loop UHF antenna element according to another alternative exemplary embodiment.

Corresponding reference numerals indicate corresponding (although not necessarily identical) parts throughout the several views of the drawings.

DETAILED DESCRIPTION

The following description is merely exemplary in nature and is in no way intended to limit the present disclosure, application, or uses.

Exemplary embodiments are disclosed of antenna assemblies configured for reception of television signals, such as high definition television (HDTV) signals. In exemplary embodiments, an antenna assembly generally includes a VHF antenna element and a UHF antenna element. The VHF antenna element and the UHF antenna element may be parasitically coupled without a direct ohmic connection between the VHF antenna element and the UHF antenna element. The antenna assembly may be configured to be operable for receiving VHF and UHF high definition television signals without using a diplexer and a VHF balun.

In exemplary embodiments, the VHF antenna element may be a shorted VHF dipole that has been configured (e.g., bent into a shape similar to a U or W, etc.) with extensions along or extending from a top of a middle portion (e.g., a top of the U or W, etc.). The VHF antenna element may be configured (e.g., shaped, sized, located, etc.) so as to achieve desired coupling to the UHF antenna element (e.g., one or more tapered loop antenna elements, etc.), which may be fed by a 75:300 Ohm balun.

The coupling between the VHF and UHF antenna elements may be adjusted by changing the distance between the planes containing each antenna element as well as the distance over which the paths of the VHF and UHF antenna elements overlap each other. The lower cut off frequency of the VHF band may be adjusted by adding or removing material from the part of the VHF antenna element that protrudes outwardly relative to and/or beyond either side of the UHF antenna element. The lower cut off frequency and bandwidth may also be affected and adjusted by changing the separation distance between the VHF and UHF antenna elements.

In exemplary embodiments, the VHF antenna element(s) may comprise one or more rods or tubes. Alternatively, the VHF antenna element(s) may comprise one or more planar elements. In exemplary embodiments that include planar VHF antenna elements, bandwidth may be improved by flaring extensions along or at a top of U-shaped, W-shaped, bent, or curved middle portion of the planar VHF antenna element into a fan or curved fan configuration.

In exemplary embodiments, the VHF antenna element may be placed in front the UHF antenna element. In alternative exemplary embodiments, the VHF antenna element may be placed behind the UHF antenna element. The offset distance between the UHF and VHF antenna elements may range from about 15 millimeters (mm) to about 45 mm depending on desired performance, element shape, and material properties. In exemplary embodiments, the VHF antenna element was placed behind UHF antenna element to allow adjustment to the shape of the VHF antenna element to accommodate housing and mounting hardware with relatively little change in performance.

In exemplary embodiments, the UHF antenna element(s) may include a single tapered loop antenna element, a double tapered loop antenna element (e.g., in a figure eight configuration having a closed shape, etc.), an arrays of single or double tapered loop antenna elements, etc. In exemplary embodiments, the VHF antenna element may include a single antenna element, a double antenna element, etc.

In exemplary embodiments, the antenna assembly may be operable without using or requiring a reflector behind the UHF and VHF antenna elements. In alternative exemplary embodiments, the antenna assembly may include one or more reflectors (e.g., grill or mesh surface, etc.) behind the UHF and VHF antenna elements.

With reference now to the figures, FIGS. 1 through 8 illustrate an exemplary embodiment of an antenna assembly 100 embodying one or more aspects of the present disclosure. As shown, the antenna assembly 100 generally includes a VHF antenna element 104 (broadly, a first antenna element) and a UHF antenna element 108 (broadly, a second antenna element). In FIG. 1, the UHF antenna element 108 is within the housing 124.

The VHF antenna element 104 may be configured to be operable for receiving VHF high definition television signals, e.g., from about 174 megahertz to about 216 megahertz, etc. The UHF antenna element 108 may be configured for receiving UHF high definition television signals, e.g., from about 470 megahertz to about 698 megahertz, etc.

The VHF antenna element 104 is parasitically coupled to the UHF antenna element 108 without benefit of direct ohmic contact. The VHF antenna element 104 and UHF antenna element 108 are electromagnetically coupled without a direct ohmic connection between the VHF antenna element 104 and the UHF antenna element 108.

The antenna assembly 100 includes a single feed point on the UHF antenna element 108, e.g., along one of the two generally side-by-side tapered loop antenna elements 112, 116 in a generally figure eight configuration as shown in FIG. 1, etc. The antenna assembly 100 includes a 75:300 ohm broadband balun. The antenna assembly 100 may include a 75-ohm RG6 coaxial cable fitted with an F-Type connector, although other suitable communication links may also be employed. Alternative embodiments may include other coaxial cables or other suitable communication links.

Figure 2:
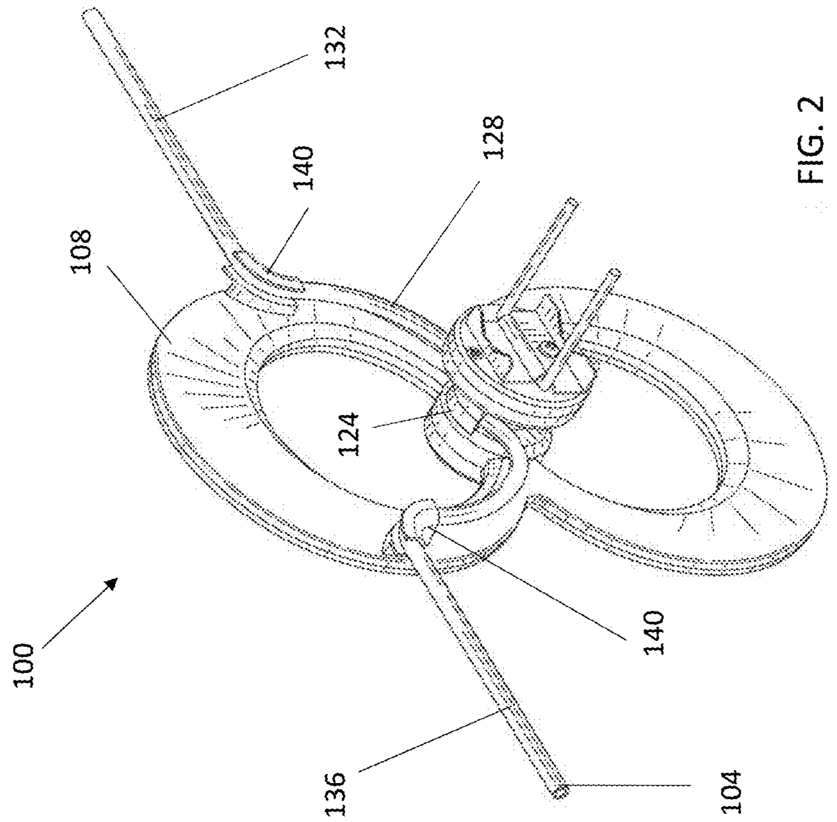
FIG. 2 is a back perspective view of the antenna assembly shown in FIG. 1.
Figure 3:
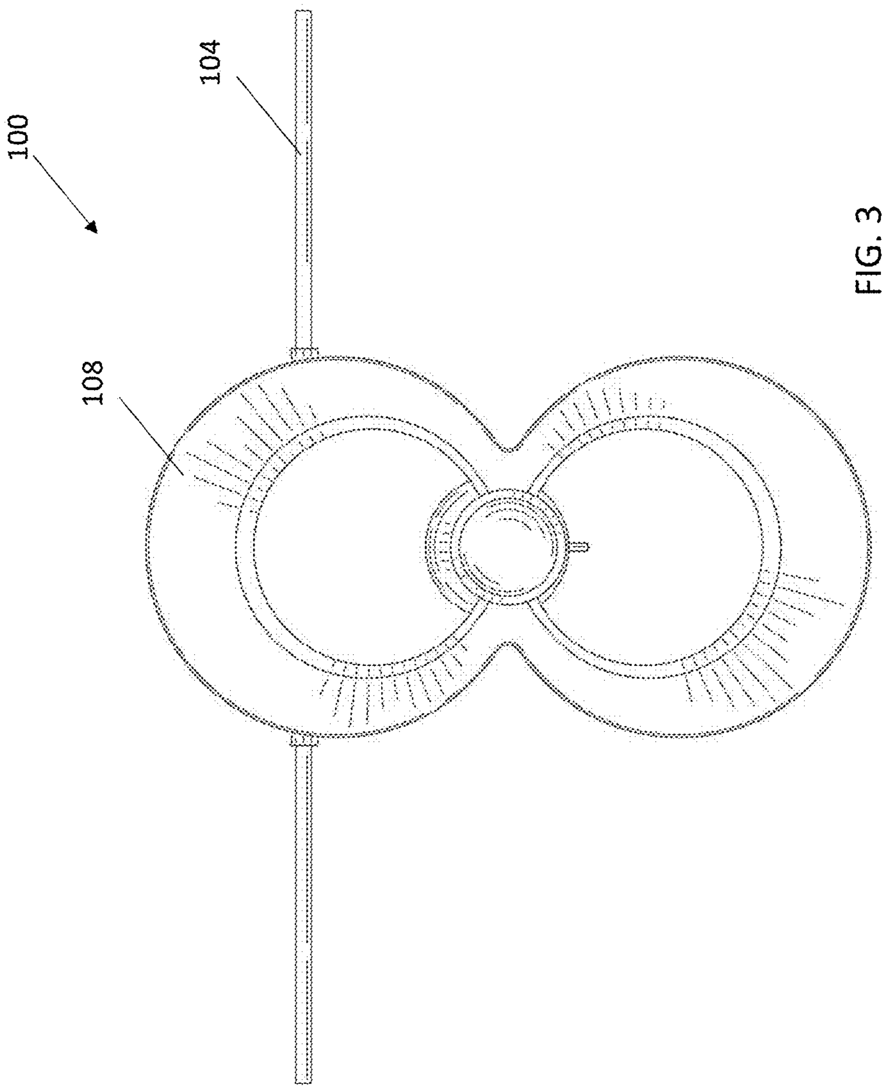
FIG. 3 is a front view of the antenna assembly shown in FIG. 1.
Figure 4:
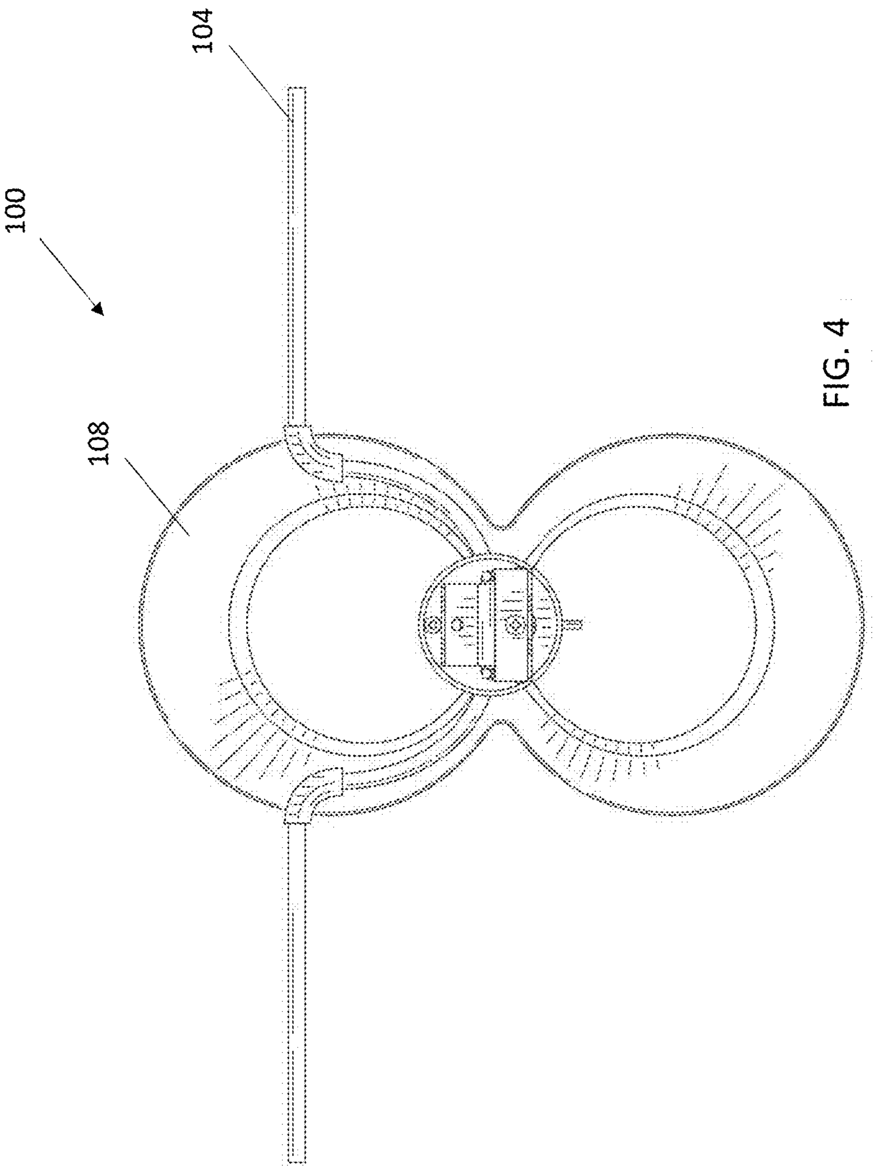
FIG. 4 is a back view of the antenna assembly shown in FIG. 1.
Figure 6:
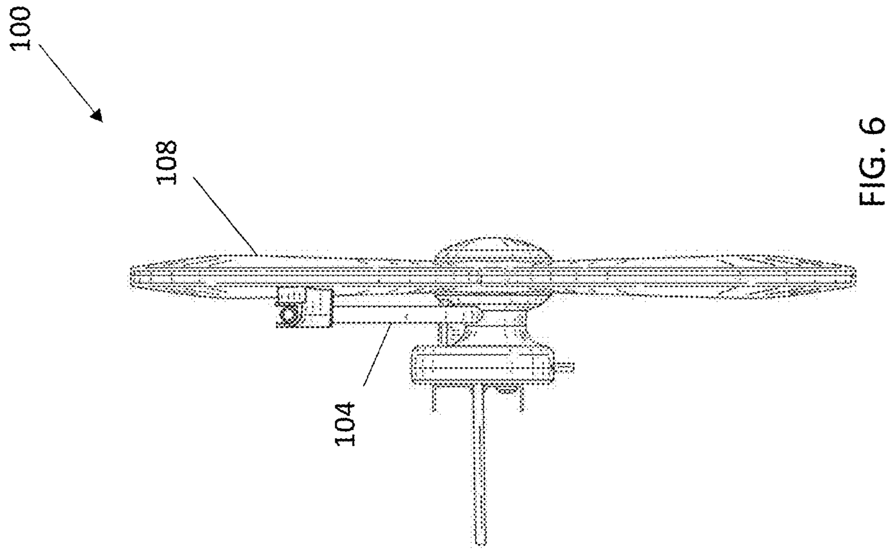
FIG. 6 is a left side view of the antenna assembly shown in FIG. 1.
Figure 5:
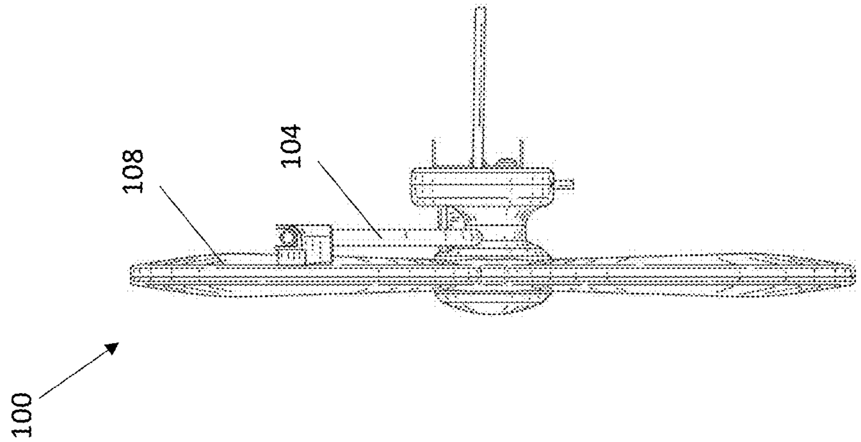
FIG. 5 is a right side view of the antenna assembly shown in FIG. 1.
Figure 7:
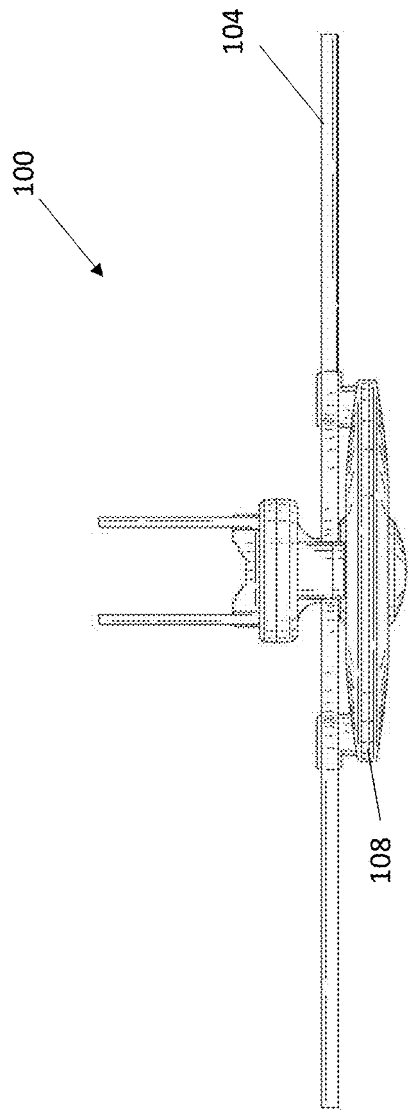
FIG. 7 is a top view of the antenna assembly shown in FIG. 1.
Figure 8:
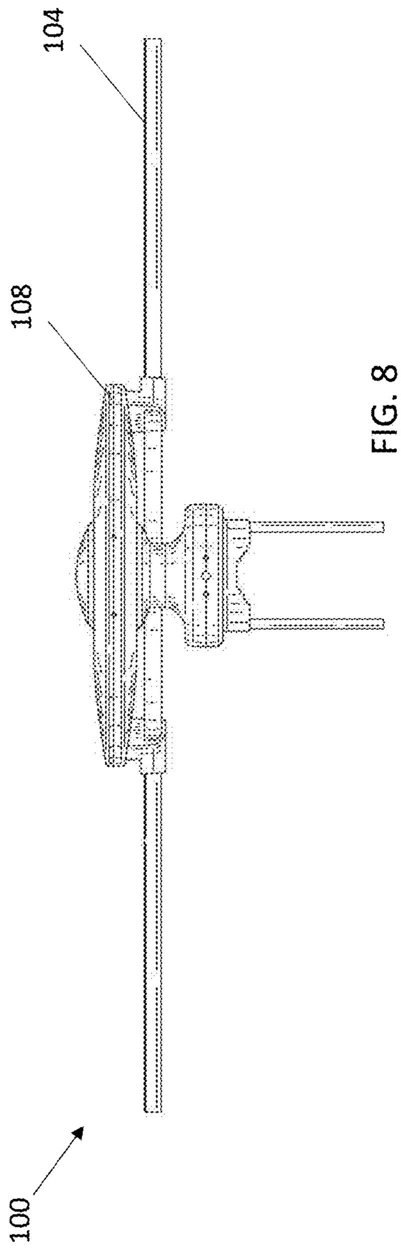
FIG. 8 is a bottom view of the antenna assembly shown in FIG. 1.

As shown in FIGS. 2, 5, and 6, the planes containing the VHF antenna element 104 and the UHF antenna element 108 may be separated by an offset or spaced distance (e.g., about 22 mm, within a range from about 15 mm to about 45 mm, etc.) along the z-direction. Accordingly, the VHF antenna element 104 is not coplanar with the UHF antenna element 108.

The VHF antenna element 104 may be formed by configuring (e.g., bending, curving, forming, etc.) a rod or tube 120 so that a curved portion 128 of the VHF antenna element 104 matches or corresponds with a curvature of the curved lower portion of the upper tapered loop antenna element 112 of the UHF antenna element 108. The rod 120 may be wrapped around a housing portion 124 near a feed region of the antenna assembly 100.

Although the VHF antenna element 104 is shown in FIGS. 1-8 as a rod 120, planar elements may also be used for VHF antenna elements in alternative exemplary embodiments. See, for example, the antenna assemblies 1100 and 1200 shown in FIGS. 33 and 34, respectively.

In this exemplary embodiment, the VHF antenna element 104 comprises a shorted VHF dipole including a U-shaped, bent, or curved middle portion 128 and first and second straight sections, portions, or extensions 132, 136 extending outwardly from each of the respective first and second sides or ends of the U-shaped middle portion 128. The first and second straight portions 132, 136 extend outwardly beyond the UHF antenna element 108.

In exemplary embodiment, the VHF antenna element 104 may be broken down into two or more pieces for more compact packaging within a box. In which case, a user may relatively easily assemble the VHF antenna element pieces or parts by fastening the pieces/parts together (e.g., with screws, other mechanical fasteners, etc.) and then snapping the assembled VHF pieces/parts into place (e.g., interference or friction fit, etc.) within holders 140 (FIG. 2) along the back of the UHF antenna element housing 124.

The antenna assembly 100 is configured to be operable as a dual band high VHF/UHF antenna. The antenna assembly 100 may be tuned by adjusting the separation distance between the VHF and UHF antenna elements 104, 108, by adjusting the curvature of the VHF antenna element 104 to control the coupling region, and by adjusting the lengths of the straight sections 132, 136 of the VHF antenna element 104 that extend from either side of the U-shaped portion 128 of the VHF antenna element 104.

The parasitic coupling may be adjusted by changing the distance between the planes containing the VHF and UHF antenna elements 104, 108 as well as the distance over which the paths of the VHF and UHF antenna elements 104, 108 overlap each other. The lower cut off frequency of the VHF band may be adjusted by adding or removing material from the part of the VHF antenna element 104 that protrudes outwardly relative to and/or beyond either side of the UHF antenna element 108. The lower cut off frequency and bandwidth may also be affected and adjusted by changing the separation distance between the VHF and UHF antenna elements 104, 108.

A main benefit that may be realized by the antenna assembly 100 is the elimination of a diplexer and VHF balun along with associated cabling and connectors. This also allows for a size reduction of the mounting assembly as well.

The antenna assembly 100 may be used for receiving digital television signals (of which high definition television (HDTV) signals are a subset) and communicating the received signals to an external device, such as a television. A coaxial cable may be used for transmitting signals received by the antenna assembly 100 to the television. The antenna assembly 100 may also be supported by a dielectric stand (e.g., plastic stand 260 shown in FIGS. 9-11, etc.) on a support surface (e.g., tabletop, shelf, desktop, other support surface, etc.) for use indoors. Or, for example, the antenna assembly 100 may be supported on a pole (e.g., pole 362 shown in FIG. 12, etc.) for use outdoors. Alternative embodiments may include an antenna assembly positioned elsewhere and/or supported using other means.

As shown in FIGS. 1-4, the UHF antenna element 108 includes two generally side-by-side tapered loop antenna elements 112, 116 in a generally figure eight configuration. Each of the upper and lower tapered loop antenna elements 112, 116 has a generally annular shape cooperatively defined by an outer periphery or perimeter portion and an inner periphery or perimeter portion. The outer periphery or perimeter portion is generally circular. The inner periphery or perimeter portion is also generally circular, such that each tapered loop antenna element has a generally circular opening.

In exemplary embodiments, each tapered loop antenna element 112, 116 may have an outer diameter of about two hundred twenty millimeters and an inner diameter of about eighty millimeters. The inner diameter may be offset from the outer diameter such that the center of the circle defined generally by the inner perimeter portion (the inner diameter's midpoint) is about twenty millimeters below the center of the circle defined generally by the outer perimeter portion (the outer diameter's midpoint). Stated differently, the inner diameter may be offset from the outer diameter such that the inner diameter's midpoint is about twenty millimeters below the outer diameter's midpoint. The offsetting of the diameters thus provides a taper to the tapered loop antenna element such that the tapered loop antenna element has at least one portion wider than another portion.

Each tapered loop antenna element 112, 116 includes first and second halves or curved portions that are generally symmetric such that the first half or curved portion is a mirror-image of the second half or curved portion. Each curved portion extends generally between a corresponding end portion and then tapers or gradually increases in width until the middle portion of the tapered loop antenna element 112, 116.

The tapered loop antenna elements 112, 116 may be substantially planar with a generally constant or uniform thickness. In an exemplary embodiment, the tapered loop antenna elements have a thickness of about 3 millimeters. Other embodiments may include a thicker or thinner antenna element.

The UHF antenna element 108 may be housed or enclosed within a housing 124 formed from various materials. In exemplary embodiments, the housing 124 is formed from plastic. In exemplary embodiments in which the antenna assembly 100 is intended for use as an outdoor antenna (e.g., FIG. 12, etc.), the housing 124 may be formed from a weather resistant material (e.g., waterproof and/or ultraviolet resistant material, etc.).

FIGS. 9, 10, and 11 illustrate a prototype 200 of the antenna assembly 100 shown in FIG. 1. As shown, the prototype antenna assembly 200 is being by a dielectric (e.g., plastic, etc.) stand 260 (broadly, a support) on a support surface (e.g., tabletop, shelf, desktop, other support surface, etc.) for use indoors. FIG. 12 shows the antenna assembly 200 being supported on a pole 262 for use outdoors.

FIG. 13 is an exemplary line graph of voltage standing wave ratio (VSWR) versus frequency (MHz) measured for the antenna assembly 200 while indoors and supported on a table by the dielectric stand 260 shown in FIGS. 9-11. As shown by FIG. 13, the antenna assembly 200 was operable with good VSWR from about 174 megahertz to about 216 megahertz and from 470 megahertz to about 698 megahertz. For example, the antenna assembly 200 had a VSWR of about 1.78 at 174 MHz, about 3.14 at 216 MHz, about 1.32 at 470 MHz, about 1.82 at 580 MHz, and about 1.18 at 698 MHz.

FIG. 14 is an exemplary line graph of VSWR versus frequency (MHz) measured for the antenna assembly 200 while outdoors on the pole 262 shown in FIG. 12. As shown by FIG. 14, the antenna assembly 200 was operable with good VSWR from about 174 megahertz to about 216 megahertz and from 470 megahertz to about 698 megahertz. For example, the antenna assembly 200 had a VSWR of about 1.70 at 174 MHz, about 3.06 at 216 MHz, about 1.52 at 470 MHz, about 1.64 at 580 MHz, and about 1.38 at 698 MHz.

FIGS. 15 through 20 illustrate a computer simulation model 300 of the antenna assembly 100 shown in FIG. 1. As shown, the antenna assembly 300 is being supported on a pole 362 for use outdoors.

FIG. 21 shows the antenna assembly 300 with a front portion of the antenna housing removed. FIG. 22 shows a portion of the antenna assembly 300 shown in FIG. 21, and illustrating a feed with 75:300 ohm balun.

As shown in FIGS. 21 and 22, end portions 310 of the tapered loop UHF antenna elements 308 are mechanically fastened to each other and to a printed circuit board (PCB) 314 by mechanical fasteners 318 that pass through aligned openings in the tapered loop antenna elements' end portions 310 and the PCB 314. The spaced distance or offset between the tapered loop UHF antenna elements 308 and VHF antenna element 304 is also shown in FIG. 22.

FIG. 23 is a line graph of VSWR versus frequency (MHz) for the antenna assembly 300 shown in FIGS. 15-22, which was computed using a Remcom X-FDTD simulator. As shown by FIG. 23, the antenna assembly 300 was operable with good VSWR from about 174 megahertz to about 216 megahertz and from 470 megahertz to about 698 megahertz. For example, the antenna assembly 300 had a VSWR of about 1.78 at 174 MHz, about 3.2 at 216 MHz, about 1.74 at 470 MHz and about 1.83 at 698 MHz.

FIG. 24 is a line graph of gain (dBi) versus frequency (MHz) boresight for the antenna assembly 300 shown in FIGS. 15-22, which was computed using a Remcom X-FDTD simulator. As shown by FIG. 24, the antenna assembly 300 was operable with good gain for frequencies from about 174 megahertz to about 216 megahertz and from 470 megahertz to about 698 megahertz. For example, the antenna assembly 300 had a gain of about 1.88 dBi at 174 MHz, about 2.83 dBi at 216 MHz, about 4.46 dBi at 470 MHz, about 6.43 dBi at 600 MHz, and about 8.44 dBi at 698 MHz.

FIG. 25 is a plot of gain (dBi) versus azimuth angle for the assembly 300 shown in FIGS. 15-22 at frequencies of 174 MHz, 195 MHz, 216 MHz, 470 MHz, 546 MHz, 622 MHz, and 698 MHz, which was computed using a Remcom X-FDTD simulator. As shown by FIG. 25, the antenna assembly 300 was operable with good gain at an azimuth angle of zero degrees for frequencies from 174 megahertz to about 216 megahertz and from 470 megahertz to about 698 megahertz. For example, the antenna assembly 300 had a gain at an azimuth angle of zero of about 1.88 dBi at 174 MHz and about 8.47 dBi at 698 MHz.

FIG. 26 illustrates an alternative exemplary embodiment of an antenna assembly 400 embodying one or more aspects of the present disclosure. The antenna assembly 400 may include features similar or substantially identical to corresponding features of the antenna assembly 100. But in this exemplary embodiment, the antenna assembly 400 includes a VHF antenna element 404 in front of (not behind) a double tapered loop UHF antenna element 408.

FIG. 27 illustrates another alternative exemplary embodiment of an antenna assembly 500 embodying one or more aspects of the present disclosure. The antenna assembly 500 may include features similar or substantially identical to corresponding features of the antenna assembly 100. But in this exemplary embodiment, the antenna assembly 500 includes a VHF antenna element 504 in front of a single tapered loop UHF antenna element 508. The middle portion 528 of the VHF antenna element 504 may be continuous and connected (e.g., not broken with a gap therebetween, etc.) and extend generally under a portion 524 of the antenna housing without making direct ohmic contact with the UHF antenna element 508.

FIG. 28 illustrates another alternative exemplary embodiment of an antenna assembly 600 embodying one or more aspects of the present disclosure. The antenna assembly 600 may include features similar or substantially identical to corresponding features of the antenna assembly 100. But in this exemplary embodiment, the antenna assembly 600 includes two VHF antenna elements 604 in front of an array of two double tapered loop UHF antenna elements 608. The VHF antenna elements 608 have alternative orientations (e.g., rotated 180 degrees, etc.) to avoid interference.

FIG. 29 illustrates another alternative exemplary embodiment of an antenna assembly 700 embodying one or more aspects of the present disclosure. The antenna assembly 700 may include features similar or substantially identical to corresponding features of the antenna assembly 100. But in this exemplary embodiment, the antenna assembly 700 includes a VHF antenna element 704 in front of a single tapered loop UHF antenna element 708 and reflector 722 (e.g., grill or mesh surface, etc.). The reflector 722 may be configured to be operable for reflecting electromagnetic waves generally towards the antenna elements 704, 708.

FIG. 30 illustrates another alternative exemplary embodiment of an antenna assembly 800 embodying one or more aspects of the present disclosure. The antenna assembly 800 may include features similar or substantially identical to corresponding features of the antenna assembly 100. But in this exemplary embodiment, the antenna assembly 800 includes a VHF antenna element 804 in front of a double tapered loop UHF antenna element 808 and reflector 822 (e.g., grill or mesh surface, etc.). The reflector 822 may be configured to be operable for reflecting electromagnetic waves generally towards the antenna elements 804, 808.

FIG. 31 illustrates another alternative exemplary embodiment of an antenna assembly 900 embodying one or more aspects of the present disclosure. The antenna assembly 900 may include features similar or substantially identical to corresponding features of the antenna assembly 100. But in this exemplary embodiment, the antenna assembly 900 includes two VHF antenna elements 904 in front of an array of two double tapered loop UHF antenna elements 908 and two reflectors 922 (e.g., grill or mesh surface, etc.). The VHF antenna elements 904 have alternative orientations (e.g., rotated 180 degrees, etc.) to avoid interference. The reflectors 922 may be configured to be operable for reflecting electromagnetic waves generally towards the antenna elements 904, 908.

FIG. 32 illustrates another alternative exemplary embodiment of an antenna assembly 1000 embodying one or more aspects of the present disclosure. The antenna assembly 1000 may include features similar or substantially identical to corresponding features of the antenna assembly 100. But in this exemplary embodiment, the antenna assembly 1000 includes a double VHF antenna element 1004 in front of a double tapered loop UHF antenna element 1008. The double VHF antenna element 1004 may include upper and lower portions having alternative orientations, which upper and lower portions may be similar to the VHF antenna element 104 of antenna assembly 100.

FIG. 33 illustrates another alternative exemplary embodiment of an antenna assembly 1100 embodying one or more aspects of the present disclosure. The antenna assembly 1100 may include features similar or substantially identical to corresponding features of the antenna assembly 100. But in this exemplary embodiment, the antenna assembly 1100 includes a double planar VHF antenna element 1104 with extensions 1132, 1136 in front of a double tapered loop UHF antenna element 1108. The extensions 1132, 1136 may configured as triangular fan extensions, have a configuration of a triangular fan blade, etc. Bandwidth may be improved by flaring the extensions 1132, 1136 along or at a top of the middle portion 1128 of the planar VHF antenna element 1104.

FIG. 34 illustrates another alternative exemplary embodiment of an antenna assembly 1200 embodying one or more aspects of the present disclosure. The antenna assembly 1200 may include features similar or substantially identical to corresponding features of the antenna assembly 100. But in this exemplary embodiment, the antenna assembly 1200 includes a double planar VHF antenna element 1204 with extensions 1232, 1236 in front of a double tapered loop UHF antenna element 1208. The extensions 1232, 1236 may configured as rounded fan extensions, have a configuration of a rounded fan blade, etc. Bandwidth may be improved by flaring the extensions 1232, 1236 along or at a top of the middle portion 1228 of the planar VHF antenna element 1204.

By way of example, an antenna assembly disclosed herein may be configured to be operable for receiving VHF high definition television signals from about 174 megahertz to about 216 megahertz (e.g., with a voltage standing wave ratio of less than about 3 referenced to a 300 ohm line, etc.) and for receiving UHF high definition television signals from about 470 megahertz to about 698 megahertz (e.g., with a voltage standing wave ratio of less than about 2 referenced to a 300 ohm line, etc.). An antenna assembly disclosed herein may be configured to operate with consistent gain throughout the entire UHF DTV channel spectrum. An antenna assembly disclosed herein may provide great performance regardless of whether it is indoors, outdoors, in an attic, etc. An antenna assembly disclosed herein may have an efficient, compact design that offers excellent gain and impedance matching across the entire post 2009 UHF DTV spectrum and with good directivity at all UHF DTV frequencies.

Alternative embodiments may include one or more UHF antenna elements that are configured differently than the tapered loop antenna elements shown in the figures. For example, other embodiments may include a non-tapered loop UHF antenna element having a centered (not offset) opening. Other embodiments may include a UHF antenna element having an outer periphery/perimeter portion, inner periphery/perimeter portion, and/or opening sized or shaped differently, such as with a non-circular shape (e.g., ovular, triangular, rectangular, etc.). The antenna elements (or any portion thereof) may also be provided in various configurations (e.g., shapes, sizes, etc.) depending at least in part on the intended end-use and signals to be received by the antenna assembly.

The antenna elements disclosed herein may be made from a wide range of materials, which are preferably good conductors (e.g., metals, silver, gold, aluminum, copper, etc.). By way of example only, the tapered loop antenna elements may be formed from a metallic electrical conductor, such as aluminum (e.g., anodized aluminum, etc.), copper, stainless steel, other metals, other alloys, etc.

Exemplary embodiments of antenna assemblies have been disclosed herein as being used for reception of digital television signals, such as HDTV signals. Alternative embodiments, however, may include one or more antenna elements tuned for receiving non-television signals and/or signals having frequencies not associated with HDTV. Thus, embodiments of the present disclosure should not be limited to receiving only television signals having a frequency or within a frequency range associated with digital television or HDTV.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 3-9, or 3-8, it is also envisioned that Parameter X may have other ranges of values including 1-9, 1-8, 1-3, 1-3, 3-10, 3-8, 3-3, 3-10, and 3-9.

The terminology used herein is for the purpose of describing particular example embodiments only and is not intended to be limiting. For example, when permissive phrases, such as “may comprise”, “may include”, and the like, are used herein, at least one antenna assembly comprises or includes the feature(s) in at least one exemplary embodiment. As used herein, the singular forms “a”, “an” and “the” may be intended to include the plural forms as well, unless the context clearly indicates otherwise. The terms “comprises,” “comprising,” “including,” and “having,” are inclusive and therefore specify the presence of stated features, integers, steps, operations, antenna elements, and/or components, but do not preclude the presence or addition of one or more other features, integers, steps, operations, antenna elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an antenna element or layer is referred to as being "on", "engaged to", "connected to" or "coupled to" another antenna element or layer, it may be directly on, engaged, connected or coupled to the other antenna element or layer, or intervening antenna elements or layers may be present. In contrast, when an antenna element is referred to as being "directly on," "directly engaged to", "directly connected to" or "directly coupled to" another antenna element or layer, there may be no intervening antenna elements or layers present. Other words used to describe the relationship between antenna elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances.

Although the terms first, second, third, etc. may be used herein to describe various antenna elements, components, regions, layers and/or sections, these antenna elements, components, regions, layers and/or sections should not be limited by these terms. These terms may be only used to distinguish one antenna element, component, region, layer or section from another region, layer or section. Terms such as "first," "second," and other numerical terms when used herein do not imply a sequence or order unless clearly indicated by the context. Thus, a first antenna element, component, region, layer or section could be termed a second antenna element, component, region, layer or section without departing from the teachings of the example embodiments.

Spatially relative terms, such as "inner," "outer," "beneath", "below", "lower", "above", "upper" and the like, may be used herein for ease of description to describe one antenna element or feature's relationship to another antenna element(s) or feature(s) as illustrated in the figures. Spatially relative terms may be intended to encompass different orientations of the device in use or operation in addition to the orientation depicted in the figures. For example, if the device in the figures is turned over, antenna elements described as "below" or "beneath" other antenna elements or features would then be oriented "above" the other antenna elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual antenna elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An antenna assembly configured to be operable for receiving at least VHF and UHF high definition television signals, the antenna assembly comprising:
- a first antenna element; and
- a second antenna element;
- wherein the second antenna element comprises a curved portion having a curvature substantially matching a curvature of a curved portion of the first antenna element that overlaps in front or in back of the curved portion of the second antenna element and that is alongside the curved portion of the second antenna element; and
- wherein:
  - the antenna assembly further comprises a printed circuit board having one or more fastener holes;
  - the first antenna element includes one or more fastener holes; and
  - the printed circuit board is attached to the first antenna element by one or more mechanical fasteners inserted through the one or more fastener holes of the printed circuit board that are aligned with the one or more fastener holes of the first antenna element.

2. The antenna assembly of claim 1, wherein:
- the first antenna element comprises a UHF antenna element; and
- the second antenna element comprises a VHF antenna element.

3. The antenna assembly of claim 1, wherein the curved portion of the first antenna element overlaps in front of the curved portion of the second antenna element.

4. The antenna assembly of claim 1, wherein the curved portion of the first antenna element overlaps in back of the curved portion of the second antenna element.

5. The antenna assembly of claim 1, wherein the first antenna element and the second antenna element are parasitically coupled without a direct ohmic connection between the first antenna element and the second antenna element.

6. An antenna assembly configured to be operable for receiving at least VHF and UHF high definition television signals, the antenna assembly comprising:
- a first antenna element; and
- a second antenna element;
- wherein the second antenna element comprises a curved portion having a curvature substantially matching a curvature of a curved portion of the first antenna element that overlaps in front or in back of the curved portion of the second antenna element and that is alongside the curved portion of the second antenna element;
- wherein the antenna assembly is configured to be operable for receiving at least VHF and UHF high definition television signals without using a diplexer and a VHF balun.

7. An antenna assembly configured to be operable for receiving at least VHF and UHF high definition television signals, the antenna assembly comprising:
- a first antenna element; and
- a second antenna element;

wherein the second antenna element comprises a curved portion having a curvature substantially matching a curvature of a curved portion of the first antenna element that overlaps in front or in back of the curved portion of the second antenna element and that is alongside the curved portion of the second antenna element;

wherein the first antenna element and the second antenna element are parasitically coupled without a direct ohmic connection between the first antenna element and the second antenna element, whereby the antenna assembly is configured to be operable for receiving at least VHF and UHF high definition television signals without using a diplexer and a VHF balun.

8. The antenna assembly of claim 1, wherein a plane including the second antenna element is spaced apart from and separated in the z-direction from a plane including the first antenna element, such that the second antenna element is not coplanar with the first antenna element.

9. The antenna assembly of claim 8, wherein the plane including the second antenna element is spaced apart from and separated in the z-direction from the plane including the first antenna element by a distance within a range from about 15 millimeters to about 45 millimeters.

10. The antenna assembly of claim 1, wherein:

the first antenna element is configured to be operable for receiving at least UHF high definition television signals from about 470 megahertz to about 698 megahertz; and the second antenna element is configured to be operable for receiving at least VHF high definition television signals from about 174 megahertz to about 216 megahertz.

11. The antenna assembly of claim 1, wherein the second antenna element comprises first and second extensions extending outwardly relative to the curved portion of the second antenna element.

12. The antenna assembly of claim 11, wherein the second antenna element comprises a dipole including the curved portion and the first and second extensions that extend linearly in opposite directions from respective first and second end portions of the curved portion of the dipole.

13. The antenna assembly of claim 1, wherein:

the first antenna element includes at least two antenna elements;

each of the at least two antenna elements includes one or more fastener holes; and the printed circuit board is attached to the at least two antenna elements by one or more mechanical fasteners inserted through the one or more fastener holes of the printed circuit board that are aligned with the one or more fastener holes of the at least two antenna elements.

14. The antenna assembly of claim 13, wherein each of the at least two antenna elements of the first antenna element includes non-circular inner and outer perimeter portions and a non-circular opening defined by the non-circular inner perimeter portion.

15. The antenna assembly of claim 1, wherein the first antenna element comprises at least one tapered and/or loop antenna element having the curved portion that overlaps in front or in back of the curved portion of the second antenna element and that is alongside the curved portion of the second antenna element.

16. The antenna assembly of claim 1, wherein the first antenna element comprises at least two antenna elements defining a generally circular or non-circular figure eight configuration.

17. The antenna assembly of claim 6, wherein:

the antenna assembly further comprises a printed circuit board having one or more fastener holes;

the first antenna element includes one or more fastener holes; and the printed circuit board is attached to the first antenna element by one or more mechanical fasteners inserted through the one or more fastener holes of the printed circuit board that are aligned with the one or more fastener holes of the first antenna element.

18. The antenna assembly of claim 1, wherein the first antenna element comprises at least one antenna element including non-circular inner and outer perimeter portions and a non-circular opening defined by the non-circular inner perimeter portion.

19. The antenna assembly of claim 1, wherein:

the antenna assembly includes a single feed point on the first antenna element; and the antenna assembly includes a 75:300 ohm broadband balun.

20. An antenna assembly comprising:

a UHF antenna element; and a VHF antenna element;

wherein a plane including the VHF antenna element is spaced apart from and separated in the z-direction from a plane including the UHF antenna element, such that the VHF antenna element is not coplanar with the UHF antenna element; and wherein the plane including the VHF antenna element is spaced apart from and separated in the z-direction from the plane including the UHF antenna element by a distance within a range from about 15 millimeters to about 45 millimeters.

21. The antenna assembly of claim 20, wherein:

the UHF antenna element is configured to be operable for receiving at least UHF high definition television signals from about 470 megahertz to about 698 megahertz; and the VHF antenna element is configured to be operable for receiving at least VHF high definition television signals from about 174 megahertz to about 216 megahertz.

22. An antenna assembly comprising:

a UHF antenna element; and a VHF antenna element;

wherein:

a plane including the VHF antenna element is spaced apart from and separated in the z-direction from a plane including the UHF antenna element, such that the VHF antenna element is not coplanar with the UHF antenna element;

the antenna assembly further comprises a printed circuit board having one or more fastener holes;

the UHF antenna element includes one or more fastener holes; and the printed circuit board is attached to the UHF antenna element by one or more mechanical fasteners inserted through the one or more fastener holes of the printed circuit board that are aligned with the one or more fastener holes of the UHF antenna element.

23. An antenna assembly comprising:

a UHF antenna element; and a VHF antenna element;

wherein:

a plane including the VHF antenna element is spaced apart from and separated in the z-direction from a plane including the UHF antenna element, such that the VHF antenna element is not coplanar with the UHF antenna element;

the UHF antenna element includes at least two antenna elements;

the antenna assembly further comprises a printed circuit board having one or more fastener holes;

each of the at least two antenna elements includes one or more fastener holes; and the printed circuit board is attached to the at least two antenna elements by one or more mechanical fasteners inserted through the one or more fastener holes of the printed circuit board that are aligned with the one or more fastener holes of the at least two antenna elements.

24. The antenna assembly of claim 23, wherein each of the at least two antenna elements of the UHF antenna element includes non-circular inner and outer perimeter portions and a non-circular opening defined by the non-circular inner perimeter portion.

25. The antenna assembly of claim 20, wherein:

the VHF antenna element comprises a curved portion having a curvature substantially matching a curvature of a curved portion of the UHF antenna element that overlaps in front or in back of the curved portion of the VHF antenna element and that is alongside the curved portion of the VHF antenna element; and the UHF antenna element comprises at least one tapered and/or loop antenna element having the curved portion that overlaps in front or in back of the curved portion of the VHF antenna element and that is alongside the curved portion of the VHF antenna element.

26. The antenna assembly of claim 25, wherein the VHF antenna element comprises first and second extensions extending outwardly relative to the curved portion of the VHF antenna element.

27. The antenna assembly of claim 26, wherein the VHF antenna element comprises a VHF dipole including the curved portion and the first and second extensions that extend linearly in opposite directions from respective first and second end portions of the curved portion of the VHF dipole.

28. The antenna assembly of claim 20, wherein the UHF antenna element comprises at least two antenna elements defining a generally circular or non-circular figure eight configuration.

29. The antenna assembly of claim 22, wherein the plane including the VHF antenna element is spaced apart from and separated in the z-direction from the plane including the UHF antenna element by a distance within a range from about 15 millimeters to about 45 millimeters.

30. The antenna assembly of claim 20, wherein the UHF antenna element comprises at least one antenna element including non-circular inner and outer perimeter portions and a non-circular opening defined by the non-circular inner perimeter portion.

31. The antenna assembly of claim 20, wherein:

the antenna assembly includes a single feed point on the UHF antenna element; and the antenna assembly includes a 75:300 ohm broadband balun.

32. An antenna assembly configured to be operable for receiving at least VHF and UHF high definition television signals, the antenna assembly comprising:

a first antenna element; and a second antenna element;

wherein a plane including the second antenna element is spaced apart from and separated in the z-direction from a plane including the first antenna element, such that the second antenna element is not coplanar with the first antenna element; and wherein the plane including the second antenna element is spaced apart from and separated in the z-direction from the plane including the first antenna element by a distance within a range from about 15 millimeters to about 45 millimeters.

33. The antenna assembly of claim 32, wherein:

the first antenna element comprises a UHF antenna element; and the second antenna element comprises a VHF antenna element.

34. The antenna assembly of claim 32, wherein:

the first antenna element is configured to be operable for receiving at least UHF high definition television signals from about 470 megahertz to about 698 megahertz; and the second antenna element is configured to be operable for receiving at least VHF high definition television signals from about 174 megahertz to about 216 megahertz.

35. An antenna assembly configured to be operable for receiving at least VHF and UHF high definition television signals, the antenna assembly comprising:

a first antenna element; and a second antenna element;

wherein a plane including the second antenna element is spaced apart from and separated in the z-direction from a plane including the first antenna element, such that the second antenna element is not coplanar with the first antenna element; and wherein the antenna assembly is configured to be operable for receiving at least VHF and UHF high definition television signals without using a diplexer and a VHF balun.

36. The antenna assembly of claim 32, wherein the first antenna element and the second antenna element are parasitically coupled without a direct ohmic connection between the first antenna element and the second antenna element.

37. An antenna assembly configured to be operable for receiving at least VHF and UHF high definition television signals, the antenna assembly comprising:

a first antenna element; and a second antenna element;

wherein:

a plane including the second antenna element is spaced apart from and separated in the z-direction from a plane including the first antenna element, such that the second antenna element is not coplanar with the first antenna element;

the antenna assembly further comprises a printed circuit board having one or more fastener holes;

the first antenna element includes one or more fastener holes; and the printed circuit board is attached to the first antenna element by one or more mechanical fasteners inserted through the one or more fastener holes of the printed circuit board that are aligned with the one or more fastener holes of the first antenna element.

38. An antenna assembly configured to be operable for receiving at least VHF and UHF high definition television signals, the antenna assembly comprising:

a first antenna element; and a second antenna element;

wherein:

a plane including the second antenna element is spaced apart from and separated in the z-direction from a plane including the first antenna element, such that the second antenna element is not coplanar with the first antenna element;

the first antenna element includes at least two antenna elements;

the antenna assembly further comprises a printed circuit board having one or more fastener holes;

each of the at least two antenna elements includes one or more fastener holes; and the printed circuit board is attached to the at least two antenna elements by one or more mechanical fasteners inserted through the one or more fastener holes of the printed circuit board that are aligned with the one or more fastener holes of the at least two antenna elements.

39. The antenna assembly of claim 38, wherein each of the at least two antenna elements of the first antenna element includes non-circular inner and outer perimeter portions and a non-circular opening defined by the non-circular inner perimeter portion.

40. The antenna assembly of claim 32, wherein:

the second antenna element comprises a curved portion having a curvature substantially matching a curvature of a curved portion of the first antenna element that overlaps in front or in back of the curved portion of the second antenna element and that is alongside the curved portion of the second antenna element; and the first antenna element comprises at least one tapered and/or loop antenna element having the curved portion that overlaps in front or in back of the curved portion of the second antenna element and that is alongside the curved portion of the second antenna element.

41. The antenna assembly of claim 32, wherein:

the second antenna element comprises a curved portion having a curvature substantially matching a curvature of a curved portion of the first antenna element that overlaps in front or in back of the curved portion of the second antenna element and that is alongside the curved portion of the second antenna element; and the second antenna element comprises first and second extensions extending outwardly relative to the curved portion of the second antenna element.

42. The antenna assembly of claim 41, wherein the second antenna element comprises a dipole including the curved portion and the first and second extensions that extend linearly in opposite directions from respective first and second end portions of the curved portion of the dipole.

43. The antenna assembly of claim 32, wherein the first antenna element comprises at least two antenna elements defining a generally circular or non-circular figure eight configuration.

44. The antenna assembly of claim 37, wherein the plane including the second antenna element is spaced apart from and separated in the z-direction from the plane including the first antenna element by a distance within a range from about 15 millimeters to about 45 millimeters.

45. The antenna assembly of claim 32, wherein the first antenna element comprises at least one antenna element including non-circular inner and outer perimeter portions and a non-circular opening defined by the non-circular inner perimeter portion.

46. The antenna assembly of claim 32, wherein:

the antenna assembly includes a single feed point on the first antenna element; and the antenna assembly includes a 75:300 ohm broadband balun.

* * * * *